United States Patent
Swindell et al.

(10) Patent No.: US 12,001,480 B2
(45) Date of Patent: *Jun. 4, 2024

(54) SYSTEM AND METHOD OF CREATING DIFFERENT RELATIONSHIPS BETWEEN VARIOUS ENTITIES USING A GRAPH DATABASE

(71) Applicant: THE DUN & BRADSTREET CORPORATION, Short Hills, NJ (US)

(72) Inventors: Stuart Swindell, Surrey (GB); Yunhong Liu, Edison, NJ (US); Thomas Kelly, Teaneck, NJ (US); Paul Westcott, Essex (GB)

(73) Assignee: THE DUN AND BRADSTREET CORPORATION, Short Hills, NJ (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/542,951

(22) Filed: Dec. 6, 2021

(65) Prior Publication Data

US 2022/0092117 A1     Mar. 24, 2022

Related U.S. Application Data

(63) Continuation of application No. 15/887,645, filed on Feb. 2, 2018, now Pat. No. 11,222,073.

(Continued)

(51) Int. Cl.
*G06F 16/901* (2019.01)
*G06F 16/245* (2019.01)
(Continued)

(52) U.S. Cl.
CPC ........ *G06F 16/9024* (2019.01); *G06F 16/245* (2019.01); *G06F 16/248* (2019.01); *G06Q 50/26* (2013.01); *G06T 11/206* (2013.01)

(58) Field of Classification Search
CPC .. G06F 16/9024; G06F 16/245; G06F 16/248; G06Q 50/26; G06T 11/206
See application file for complete search history.

(56) References Cited

U.S. PATENT DOCUMENTS 6,578,016 B1 * 6/2003 Trankina ............... G06Q 40/10
705/36 T
7,996,308 B1 * 8/2011 Bent ..................... G06Q 20/10
705/35

(Continued)

OTHER PUBLICATIONS

Stefania Vitali et al: "The network of global corporate control", arxiv.org, Cornell University Library, 201 Olin Library Cornell University Ithaca, NY 14853, Jul. 28, 2011, XP080518172, DOI: 10.1371/JOURNAL.PONE.0025995, 36 pgs.

(Continued)

*Primary Examiner* — Pierre M Vital
*Assistant Examiner* — Zuheir A Mheir
(74) *Attorney, Agent, or Firm* — Ohlandt, Greeley and Perle, LLP

(57) ABSTRACT

A system and method for determining the extent of beneficial ownership of a target business by populating a database structure wherein businesses and ownership relationships between the business are represented by nodes and links. Steps include querying the database to establish the related ownership links; analyzing results of the query to determine ownership loops; de-looping the ownership relationships; and calculating the percentage ownership of each of the beneficial owners of the target business based on de-looped ownership relationships. A computer readable non-transitory storage medium stores instructions of a computer program, which when executed by a computer system results in performance of steps of the method. A system architecture having features uniquely suited to the task is also disclosed.

28 Claims, 34 Drawing Sheets

Definition

T = Target Duns;
C = company shareholder;
P = Nature Person Shareholder
Origin is at T
Nearest = shortest linkage to T
Furthest = longest linkage to T Linear ownership structure (graph 1): All the C and P have one-way ownership, no subsidary has ownership on it's shareholder(s)

Linear ownership structure (graph 2): when T or Ci owns shares of it's own shareholder(s) Ci+n, then the ownership structure between Ci and Ci+n is a looping ownership structure. In graph 2, T and C2 is one loop, C2 and C3 is another loop. T and C3 is also a loop.

Loop Point: in the case above, Ci become a loop point, a loop point is considered the loop initiator. In graph 2, T is the loop point for the TC2 loop, C2 is the loop point for C2 C3 loop, T is the loop point for T C3 loop. C3 is not a loop point since it is not a initiator of any loop.

De-Looping: use calculation to directly link P and C to the loop point and change a looping structure to a linear structure.

loop-adjusted ownership formula: face ownership/(1-self-ownership of the nearest loop point)

Graph 1

Graph 2

Related U.S. Application Data

(60) Provisional application No. 62/454,572, filed on Feb. 3, 2017.

(51) Int. Cl.
  *G06F 16/248* (2019.01)
  *G06Q 50/26* (2012.01)
  *G06T 11/20* (2006.01)

(56) References Cited

U.S. PATENT DOCUMENTS

| | | | | |
|---|---|---|---|---|
| 8,674,993 | B1 * | 3/2014 | Fleming | G06Q 40/06 707/794 |
| 2007/0211056 | A1 * | 9/2007 | Chakraborty | G06T 11/206 345/440 |
| 2007/0299836 | A1 * | 12/2007 | Hou | G06F 16/2452 |
| 2010/0125481 | A1 * | 5/2010 | Kennedy | G06Q 40/06 705/35 |
| 2015/0220588 | A1 | 8/2015 | Krauss | |
| 2015/0317384 | A1 * | 11/2015 | Rooney | G06Q 30/02 707/741 |
| 2016/0335722 | A1 * | 11/2016 | Bous | G06Q 40/06 |
| 2018/0121529 | A1 * | 5/2018 | Asadi | G06F 16/2471 |

OTHER PUBLICATIONS

Huang Hongcheng et al: "Research on architecture and query performance based on distributed graph database Neo4j", 2013 3rd International Conference on Consumer Electronics, Communications and Networks, IEEE, Nov. 20, 2013, pp. 533-536, XP032542539, DOI: 10.1109/CECNET.2013.6703387 ISBN: 978-1-4799-2859-0.

Extended European Search Report dated Sep. 15, 2020 in corresponding European Patent Application 18747934.0, 12 pages.

International Preliminary Report on Patentability dated Aug. 15, 2019 in corresponding International PCT Patent Application No. PCT/US2018/016692, 9 pages.

International Search Report dated Apr. 9, 2018 from corresponding International Patent Application No. PCT/US2018/016692, 3 pages.

Written Opinion dated Apr. 9, 2018 from corresponding International Patent Application No. PCT/US2018/016692, 13 pages.

Canadian Office Action dated Jun. 29, 2023 for Canadian Appl. No. 3,052,305.

* cited by examiner

Definition

T = Target Duns;
C = company shareholder;
P = Nature Person Shareholder
Origin is at T
Nearest = shortest linkage to T
Furthest = longest linkage to T Linear ownershp structure (graph 1): All the C and P have one-way ownership, no subsidiary has ownership on it's shareholder(s)

Linear ownership structure (graph 2): when T or Ci owns shares of it's own shareholder(s) Ci+n, then the ownership structure between Ci and Ci+n is a looping ownership structure. In graph 2, T and C2 is one loop, C2 and C3 is another loop. T and C3 is also a loop.

Loop Point: in the case above, Ci become a loop point: a loop point is considered ithe loop initiator. In graph 2, T is the loop point for the TC2 loop, C2 is the loop point for C2 C3 loop. T is the loop point for T C3 loop. C3 is not a loop point since it is not a initiator of any loop.

De-Looping: use calculation to directly link P and C to the loop point and change a looping structure to a linear structure.

loop-adjusted ownership formula: face ownership/(l-self-ownership of the nearest loop point)

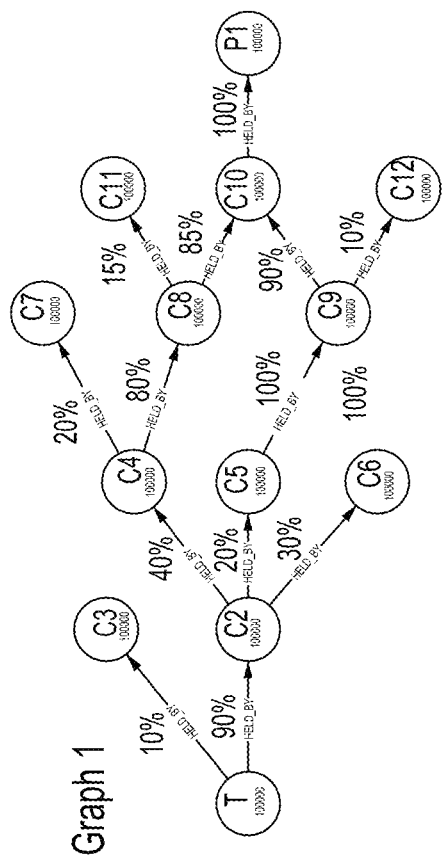

Graph 1

FIG. 2A

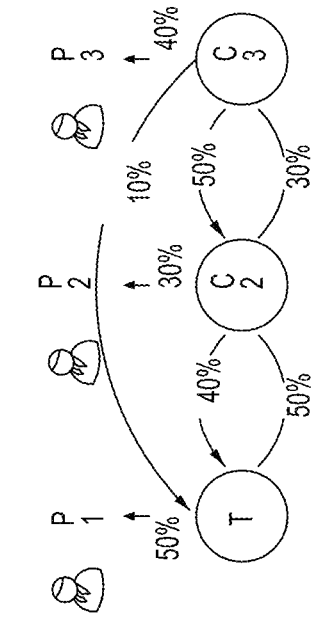

Graph 2

FIG. 2B

Logic for linear structures:

1. Start from the T (target Duns)
2. Calculate the Direct ownerships assign any missing ownership % to Unknown P and make total direct ownership = 100%
3. Any C has the direct ownership needs to be calculated through upeer level indirect ownerships, assign missing ownerhips to Unknown P
4. If there is still C left as the indirect owner at upper level, repeat the process 3 until all the ownership are directed to Pi or unknown P
5. Aggregate the direct and indirect ownership of each Pi to get Pi's total ownership on T. Pi is the ultimate beneficial owner.
6. Aggregate the direct and indirect ownership of unknown P to get unknown P's total ownership on T. this is the unallocated ownership for T which means there is no enough data to discover the 100% ownership.

Example:
T = 10% C3 + 90% C2 = 10%C3+90%(40%C4=20%C5+30%p1+10%UnknownP)
=10%C3+90%(40%(20%C7+80%C8)=20%C9+30%p1+10%UnknownP)
10%C3+90%(40%(20%C7+80%C8)+20%(10%C12+90%C10)+30%P1+10%UnknownP)
=........=%P1+%P2+% UnknownP

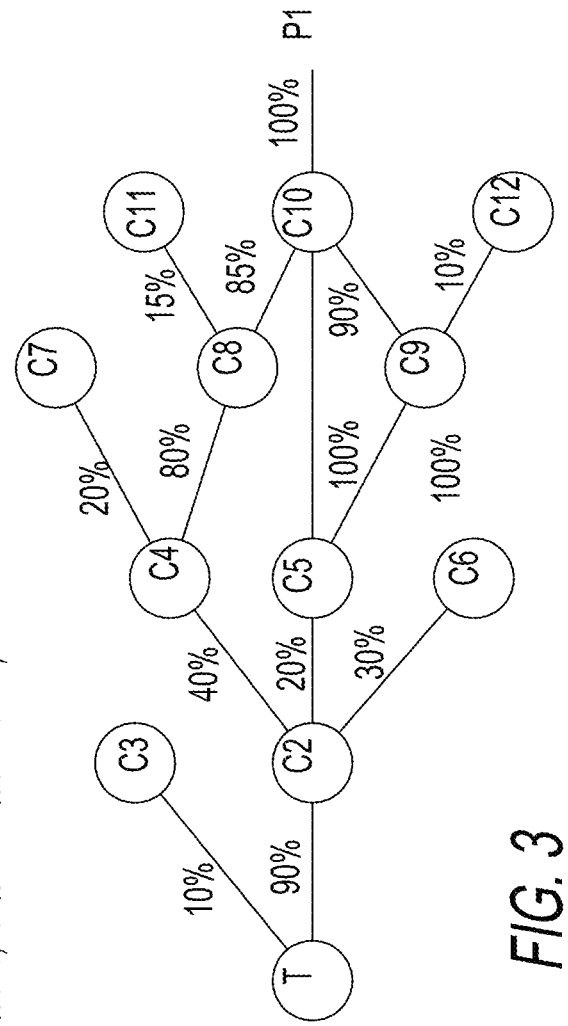

FIG. 3

Logic for Looping structures 2:

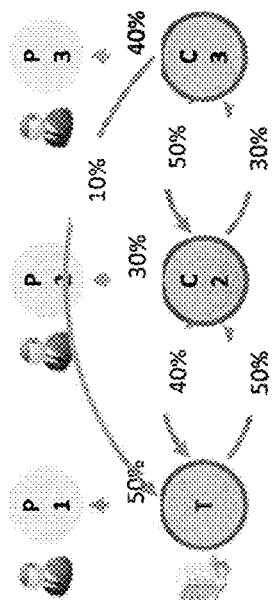

FIG. 4A

5. Identify all of the Loop Points and Looping structures:

During 3, When a upper level shareholder Ci is entirely or partially owned by any Ci-n or T ( any Ci-n or T that Ci owns its shares directly or indirectly), then Ci-n Ci loop is recognized, Ci-n is tagged as the loop point.

FIG. 4B

T owns shares of a upper level entity C2, so T is identified as the nearest/first Loop Point and T C2 loop is identified as the first loop
Keep calculate the indirect ownership as described in 3 except: whenever a loop point(Ci-n) is observed, no need to calculate/break through the (Ci-n), leave it as if it is a P in the chain until we de-loop Ci later.

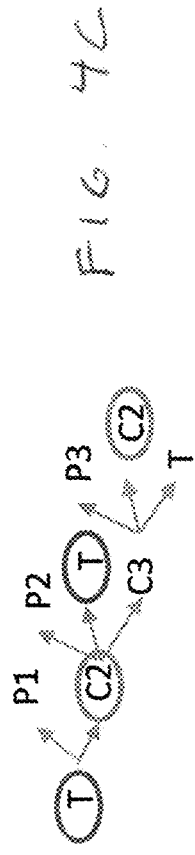

FIG. 4C

C2 owns shares of a upper level entity C3, so C2 is identified as a Loop Point and C2/C3 marked

Query Rules

3. Ownership paths may include loops in which DUNS A has ownership of DUNS B which, in turn, may have ownership of DUNS A.

The controlled ownership calculation that includes a loop is the product of all $X_n$, where $X$ is a relationship link from one DUNS to a corporate shareholder. $Y_n$ is a relationship link from a corporate shareholder to an earlier-visited DUNS that holds ownership in that corporate shareholder. The shareholder percent $Y_n$ is excluded from the shareholder ownership calculation, and the link back to a previously-visited node is ignored.

For example,

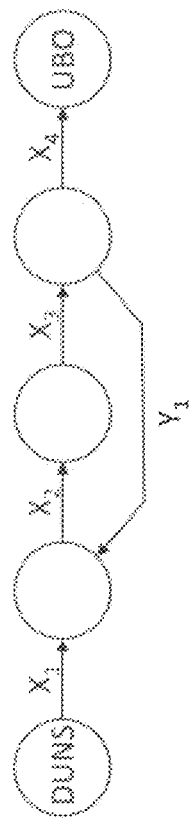

d = Multiplier .01
UBO Indirect Ownership = $dX_1 * dX_2 * dX_3 * dX_4 * 100$

FIG. 4D

Query Rules

5. Calculation of Indirect Ownership may include multiple paths. For example, d = Multiplier .01
UBO Indirect Ownership = $dX_1 * ((dX_2 * dX_3 * dX_4) + (dX_6 * dX_7)) * dX_5 * 100$ In this case, the multiple paths converge on a corporate shareholder for which the UBO has direct ownership. This rule does not cover the case where the UBO has two or more different identifiers.

Query Rules

Beneficial ownership is calculated through three rules (6, 7, and 8), which is described through three sets of slides. While each is discussed separately, the combination of rules is required to accurately perform the calculation.

6. Beneficial ownership is defined as the portion of the total ownership that a particular owner receives. The beneficial ownership calculation is $X / Z * 100$, where X is the UBO direct or indirect ownership and Z is the sum of all UBO direct/indirect controlled ownership. Only UBOs' direct and indirect ownership will be included in this calculation of total ownership.

For example,

FIG. 4G $Z = X_1$ ($X_2$ is not held by a UBO, so does not have a direct or indirect ownership that will be included in the calculation of total ownership)

UBO's Beneficial Ownership of Target DUNS = $X_1 / Z * 100$

C1 Ownership

- Controlled Ownership
  - P1 Direct Ownership 50%
  - P2 Indirect Ownership 25% (50% * 50%)
  - C2 Direct Ownership 50%
- Beneficial Ownership
  - P1 Beneficial Ownership 66.6666667%
  - P2 Beneficial Ownership 33.3333333%

Beneficial Ownership (Target C1)

Z = 50% + 25%

P1 UBO = 50% / 75% => 66.6666667%

P2 UBO = 25% / 75% => 33.3333333%

Query Rules

7. Ownership that is retained by a corporation, and not allocated to other corporations or UBOs, is Corporate Beneficial Ownership. CBO direct or indirect ownership is included in the sum of all direct/indirect controlled ownership. Only UBOs' and CBOs' direct and indirect ownership will be included in this calculation of total ownership.

For example,

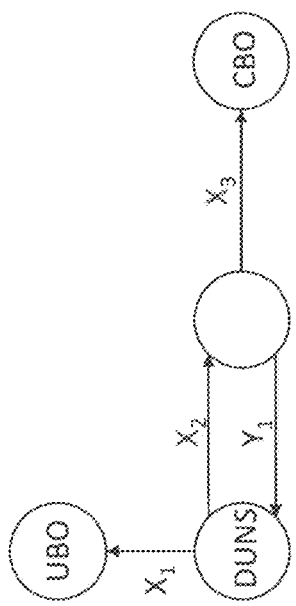

$Z = X_1 + (X_2 * X_3)$
UBO's Beneficial Ownership of Target DUNS = $X_1 / Z * 100$
CBO's Beneficial Ownership of Target DUNS = $(X_2 * X_3) / Z * 100$

FIG. 4K

Display percentage of ownership for each entity within the structure view and provide an 'others' entity for when the tier does not meet 100% ownership Query Rules 8. A corporation may retain some ownership, while allocating the remainder of its ownership to other owners. This unallocated ownership is included in the sum of all direct/indirect controlled ownership. Only UBOs' and CBOs' direct and indirect ownership, as well as this unallocated ownership, will be included in this calculation of total ownership.

For example, d = Multiplier .01
$U_1 = 100 - \text{sum}(Y_n)$
Other Indirect Ownership (OIO) = $dX_2 * U_1$
$Z = X_1 + OIO$
UBO's Beneficial Ownership of Target DUNS = $X_1 / Z * 100$
'Other' Beneficial Ownership of Target DUNS = $OIO / Z * 100$

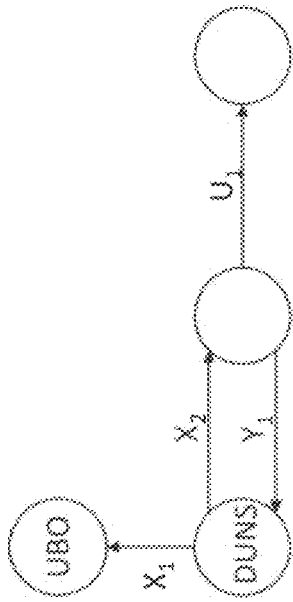

FIG. 4M

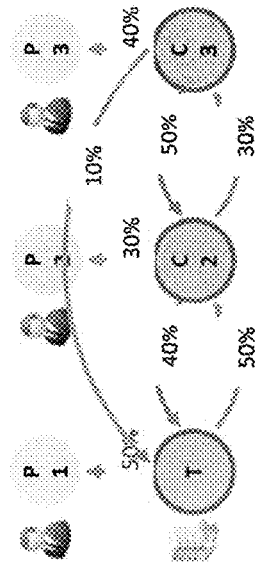

FIG. 5A

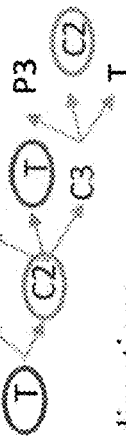

FIG. 5B

Logic for Looping structures 3:

7. Decide the furthest loop and loop point: upon completion on the indirect ownership calculation( face value), the system need to determine which loop point is the furthest loop point toward T:

in this case, above C2, there is no more loop point, so C2 is the furthest loop point
The C2/C3 loop is the furthest loop,

When the structure is more complex with looping structures in multiple linear directions the furthest loop point is decided by:

a. Line up the loop point by how far it is from T, and tag the furthest loop point for each line
b. compare all loop point to see if there is any furthest loop point from other lines is further than the furthest loop point in reviewed the line.
c. By comparing all lines, we can find out which one is the furthest loop point

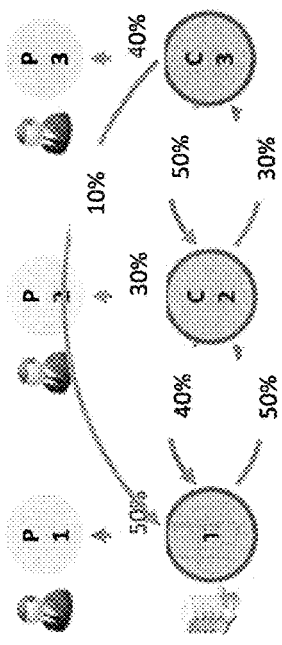

FIG. 6

Logic for Looping structures 4:

8. Self-ownership calculation: Use the defined de-loop calculation to de-loop the furthest loop and calculate the self-ownership of the loop point.

9. Use the self-ownership of each loop point and the Pi formula to calculate the real/loop adjusted indirect ownership for each P.

10. Use the results from the de-loop calculation to calculate the next furthest loop point's self-ownership.

11. Repeat point 10, until all loop points' self ownership are calculated.

12. Aggregate the direct and real/loop adjusted indirect ownership of each Pi to get Pi's total ownership on T. Pi is the ultimate beneficial owner.

13. Aggregate the direct and real/loop adjusted indirect ownership of unknown P to get unknown P's total ownership on T. This is the unallocated ownership for T which means there is no enough data to discover the 100% ownership

Why we don't calculate through the loop point once it is indentified

Once a C is identified as a loop point, if it shows up again in a higher level indirect ownership calculations (means C is also a shareholder of a higher level company), system will leave this loop point as if it is a P, no need to further break down by it's ownership.

Because if we cntinue break down the ownership on the loop point, then it will become a endless circle: illustrated in above yellow boxes). The loop point's self-ownership will be calculated once all further loops have been de-looped.

In the example: T is identified as a loop point, therefore, system should not break down/calculate through the T in the first yello box..... Otherwise, it will endless repeat the pattern as shown in the yellow boxes.

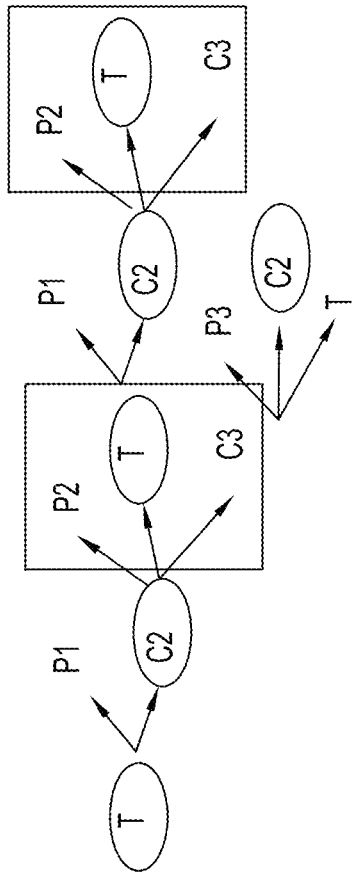

Example of a wrong break through calculation

FIG. 8

SYSTEM AND METHOD OF CREATING DIFFERENT RELATIONSHIPS BETWEEN VARIOUS ENTITIES USING A GRAPH DATABASE

This application is a continuation of U.S. application Ser. No. 15/887,645, filed on Feb. 2, 2018, which claims priority from and the benefit of U.S. provisional patent application Ser. No. 62/454,572, filed on Feb. 3, 2017. These applications are incorporated herein by reference, in their entireties, for all purposes.

BACKGROUND OF THE DISCLOSURE

1. Field of the Disclosure

The present disclosure relates to apparatus and methods for determining beneficial ownership. More particularly it relates to an apparatus and method for determining the ultimate beneficial owner in a corporate hierarchy using graphical data structures, especially in situations where standard analysis methods and apparatus may not discern such information, or where such information cannot be easily or accurately obtained.

2. Description of the Related Art

The financial regulatory landscape is becoming more complex and diverse. Regulatory authorities are seeking more detailed information to assist them their efforts in anti-money laundering, anti-bribery and corruption, counter-terrorist financing, sanctions and watch list screening, and monitoring of politically exposed persons. With respect to sometimes complex corporate structures, it is necessary to be able to identifying and verifying the ultimate beneficial owners or customers and third parties to allow institutions to improve regulatory compliance and reduce risk is due diligence efforts. The financial Action Task Force (FATF) has defined the beneficial owner "as the natural person(s) who ultimately owns or controls a legal entity and/or the natural person on whose behalf a transaction is being conducted. It also includes those persons who exercise ultimate effective control over a legal person or arrangement."

In many systems being used today, the corporate ownership information is designed using a traditional relational model and implemented in a Relational Database Management System (RDBMS). The drawback of using an RDBMS is that identifying the ownership is a multistep process, wherein the system is limited to retrieving one level of ownership only. The user's action is required to gather the next level. Beneficial ownership calculation is not possible as the entire ownership structure is not available for the calculation. Relational databases do not have a concept of relationships stored, so in effect to find a 'relationship' or commonality between records a relational database has to look at each record every time to see if it has a common factor.

Thus, conventional systems and methods for determining beneficial owners are sometimes inefficient and inaccurate. Conventional representations of a corporate hierarchy as a tree structure can miss key ownership links concerning individuals. Further, they generally cannot account for the case wherein a subsidiary has some ownership in a parent company, which in turn has ownership of the subsidiary.

Further, it is estimate that, on average a user doing desktop research would spend approximately fifteen minutes on one relatively simple business record to calculate the ownership to the required regulatory standard.

Recently graph databases have been used in various applications. Graph databases are based on graph theory. Graph databases employ nodes, edges and properties. Nodes represent entities such as people, businesses, accounts, or any other item you might want to keep track of They are roughly the equivalent of the record, relation or row in a relational database, or the document in a document database.

Properties are pertinent information that relate to nodes. For instance, if Wikipedia were one of the nodes, one might have it tied to properties such as website, reference material, or word that starts with the letter w, depending on which aspects of Wikipedia are pertinent to the particular database.

There is a need for a system and method for determining the beneficial owner that is accurate, computationally efficient, and that meets various regulatory requirements.

SUMMARY OF THE DISCLOSURE

This disclosure utilizes the advancement in data organization and their technologies, such as a graph database (for example Neo4j) to ensure easy traversal of organization ownership structure for Ultimate Beneficial Owner (UBO) calculation.

When importing data into a graph database, the relationships are treated with as much value as the database records themselves. This facilitates building complex queries associated with connections between nodes in real time (in this case, businesses and the people who own the shares in those businesses). This is of great importance because customers, or other users, generally need to determine beneficial ownership instantly.

A graph database (as opposed to a standard relational database) supports the automation of activity so it requires no human intervention, or front of office support teams in financial institutions who must comply with regulations before trades or customer engagements can be processed.

More specifically, running the required computations in mere milliseconds by accessing a graph database compares favorably to the exponential slowdown of many-JOIN SQL queries in a relational database. For example, in a database of 280 million business records, there are just too many records to check each time, or at each level of a computation. Graphs maintain these relationships within their ecosystem so what attributes of a record are the same/similar and why they could form a relationship can be ascertained almost instantly. The type of relationship and the proximity are things that can be determined with great speed and efficacy, based on the question posed by the user.

In general, an embodiment of the disclosure is directed to a system and a method for representing ownership structures in a database. A number of businesses may each be represented as nodes in a structure, with ownership interests being represented as links between the nodes. The ownership structure may include looping corporate relationships (a means by which a company owns part or all of itself through share ownership in other companies). The system and method allows for de-looping the data structure to perform the calculations needed to establish beneficial ownership.

Also in accordance with the disclosure, a series of patterns in relationships are recognized, for which there may be predetermined types of calculations to perform the beneficial ownership calculations, or a portion thereof. These patterns can be recognized in portions of, or in the entire ownership structure. The specific calculations to be performed can go forward with respect to these recognized patterns. The results of the calculation for each of the patterns can be combined, to provide results with respect to beneficial ownership.

Specifically, the disclosure is directed to a system and a method for determining the extent of beneficial ownership of a target business by populating a database structure wherein businesses, locations and ownership relationships between the business are represented by nodes and links; query the database to establish the related ownership links; analyze the query to determine ownership loops; de-looping the ownership relationships; and calculating the percentage ownership of each of the beneficial owners of the target business based on de-looped ownership relationships.

Any linear ownership relations in the database are also analyzed to calculate the percentage ownership of each of the beneficial owners of the target business.

The disclosure is also directed to computer readable non-transitory storage medium that stores instructions of a computer program, which when executed by a computer system results in performance of the method disclosed herein.

Also disclosed are architectures for a system for executing the methods disclosed herein. These architectures enable all of the relevant calculations to be performed in seconds, thus facilitating accurate reporting.

BRIEF DESCRIPTION OF THE DRAWINGS

FIG. 2A illustrates a linear ownership structure.

FIG. 2B illustrates a looped ownership structures.

FIG. 3 illustrates the logic of a linear ownership structure.

FIG. 4A, FIG. 4B and FIG. 4C illustrate logic for determining loop ownership structure.

FIG. 4D illustrates a query rule for a first case involving an ownership loop.

FIGS. 4G through 4N illustrate further rules or patterns for performing beneficial ownership calculations.

FIG. 5A and FIG. 5B illustrate next steps in the logic following FIG. 4C.

FIG. 6 illustrates further steps in the logic, following FIG. 5B.

FIG. 8 illustrates an improper calculation mode.

FIG. 10 illustrates analysis of a first part of the structure of FIG. 10.

A component or a feature that is common to more than one drawing is indicated with the same reference number in each of the drawings.

DESCRIPTION OF THE EMBODIMENTS

Definitions

Figure 1:
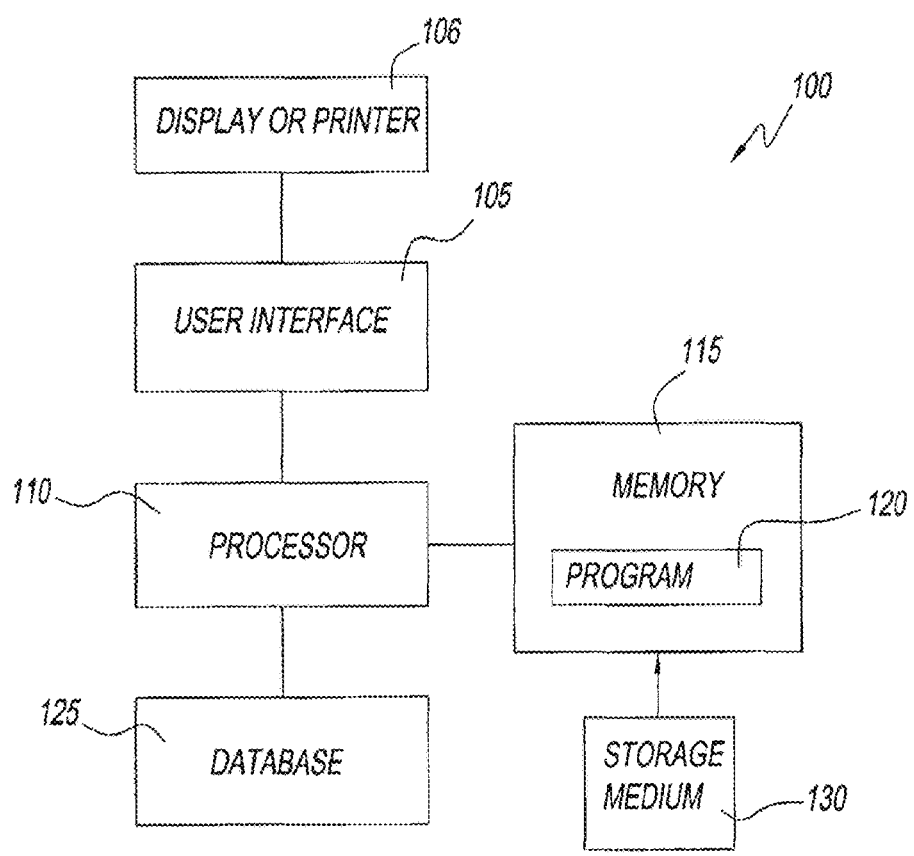
FIG. 1 is a block diagram of a computer system for implementation of the present disclosure.

The following definitions will be used in herein:

GBO—Global Beneficial Ownership—A term to represent a global shareholder database UBO—Ultimate Beneficial Ownership—'Individuals' as owners who are the actual owners of the subject DUNS.

CBO—Corporate Beneficial Owner—a company that benefits from owning shares of subject business where there is no further information to determine a person who has ownership.

Subject/Target located at the origin (T)—This is the DUNS number started from to find Beneficial Ownership (BO), which cannot be a Branch DUNS.

Path—The route from a Subject/Target to and end point, which is generally either a CBO or a UBO.

Furthest=longest linkage to T or the depth.

Nearest=shortest linkage to T

Node—The single term for the 3 types of entities that can create a node in the structure. Two nodes are required to form a relationship. Nodes come in three types (corporate/Individuals/entities).

Structure—The set of connected relationships associated with a subject DUNS.

Entity—One of three types of Nodes—1=Corporate or company shareholder (C), 2=Individual or natural person shareholder (P) or 3=an entity that is within a structure.

List—A calculated subset of the entities in the structure based on the query. A list generally shows Direct, Indirect, Controlling or Beneficial Owners.

DUNS—A particular business, generally as represented by a given Dun & Bradstreet number.

Direct Owner—An entity that holds shares in the subject DUNS directly (either a majority or a minority).

Indirect Owner—An entity that holds shares in the subject DUNS but has an entity owning those shares between itself and the subject DUNS (either a majority or a minority).

Ownership Loop—A situation in which Entity A has ownership in Entity B, and Entity B has ownership in Entity D, either directly or indirectly.

Controlling—A list of both Direct and Indirect Owners.

Beneficial Owners—A list of nodes that beneficially own shares in the subject DUNS based on the ownership criteria that has been requested i.e. any node with 25% or more of the beneficial ownership.

Undisclosed Owners—There is awareness of a stake or a level of ownership between two nodes. However, the true amount has not been disclosed (but it would be between 0.01% and 100%).

Has Majority—An entity that owns shares in another node where the precise amount is undisclosed but D&B is aware that is equates to more than 50.01%.

Self link—A relationship wherein a corporate entity owns shares in itself.

Graph database—A type of database that is well suited for storing data and calculating relationships that are not relational.

Calculations

The following types of calculations are used herein.

Simple multiplication is used for linear relationships.

Equal Proportionate Distribution is used for simplistic looping or hidden relationships.

Geometric Progression is used for more complex looping relationships and when shareholders are undisclosed. A geometric progression (GP) is a sequence of non-zero terms in which each succeeding term is obtained by multiplying its preceding term by a constant. In this case we create a constant for undisclosed entities in order to support the need to multiply proceeding relationships even though an exact percentage of ownership is now missing.

Procedures

The following procedures are used based on the pattern of the corporate ownership structure of the target.

A. Build out the entire structure first
B. Determine the types of relationships within the structure (examples: looping, hidden. direct).
C. Use the different types of calculations or patterns mentioned above (one or many on the same structure) on the target.
D. Perform at least one of generating, storing, displaying and printing the results.

FIG. 1 is a block diagram of a computer system 100 for implementation of the system and method disclosed herein. System 100 includes a user interface 105, a processor 110, a memory 115 and a database 125. System 100 may be implemented on a general-purpose computer. Although system 100 is represented herein as a standalone system, it is not limited to such, but instead can be coupled to other computer systems, including servers having extensive databases (not shown) via a network (not shown).

Memory 115 stores data and instructions for controlling the operation of processor 110. An implementation of memory 115 would include a random access memory (RAM), a hard drive and a read only memory (ROM). One of the components of memory 115 is a program 120.

Program 120 includes instructions for controlling processor 110 to execute methods described herein. For example, program 120 is a collection of instructions that are executable by processor 110 to control processor 110 to perform the method described herein. Preferably, the results obtained for extent of ownership of the UBO is output via user interface 105 to a display or printer 106.

Program 120 may be implemented as a single module or as a plurality of modules that operate in cooperation with one another. The term "module" is used herein to denote a functional operation that may be embodied either as a stand-alone component or as an integrated configuration of a plurality of sub-ordinate components.

User interface 105 includes an input device, such as a keyboard or speech recognition subsystem, for enabling a user to communicate information and command selections to processor 110. User interface 105 also includes an output device such as a display or a printer 106. A cursor control such as a mouse, track-ball, or joy stick, allows the user to manipulate a cursor on the display for communicating additional information and command selections to processor 110.

While program 120 is indicated as already loaded into memory 115, it may be configured on a storage medium 125 for subsequent loading into memory 115. Storage medium 125 can be any conventional storage medium that stores program 120 thereon in a tangible form. Examples of storage medium 125 include a magnetic tape, an optical storage media, a compact disk, or a floppy disk. Alternatively, storage medium 125 can be a random access memory, or other type of electronic storage, located on a remote storage system.

Computer system 100 can be used as a terminal connected to a more complex system architecture as described below, or can be used, if sufficient resources are available, to execute the methods described herein.

FIG. 2A and FIG. 2B are associated with the following additional definitions.

Linear ownership structure (Graph 1): All the C and P have one-way ownership; no subsidiary has ownership of its shareholder(s).

Looping ownership structure (Graph 2): when T or Ci owns shares of its own shareholder(s) Ci+n, then the ownership structure between Ci and Ci+n is a looping ownership structure. In graph 2, T and C2 is one loop, C2 and C3 is another loop, and T and C3 is also a loop.

Loop Point: in the case above, Ci becomes a loop point; a loop point is considered the loop initiator. In graph 2, T is the loop point for the TC2 loop, C2 is the loop point for C2 C3 loop, T is the loop point for T C3 loop, C3 is not a loop point since it is not an initiator of any loop.

De-Looping: use calculation to directly link P and C to the loop point and change a looping structure to a linear structure.

A loop-adjusted ownership formula is: ownership %/(1−self-ownership %).

Figure 2C:
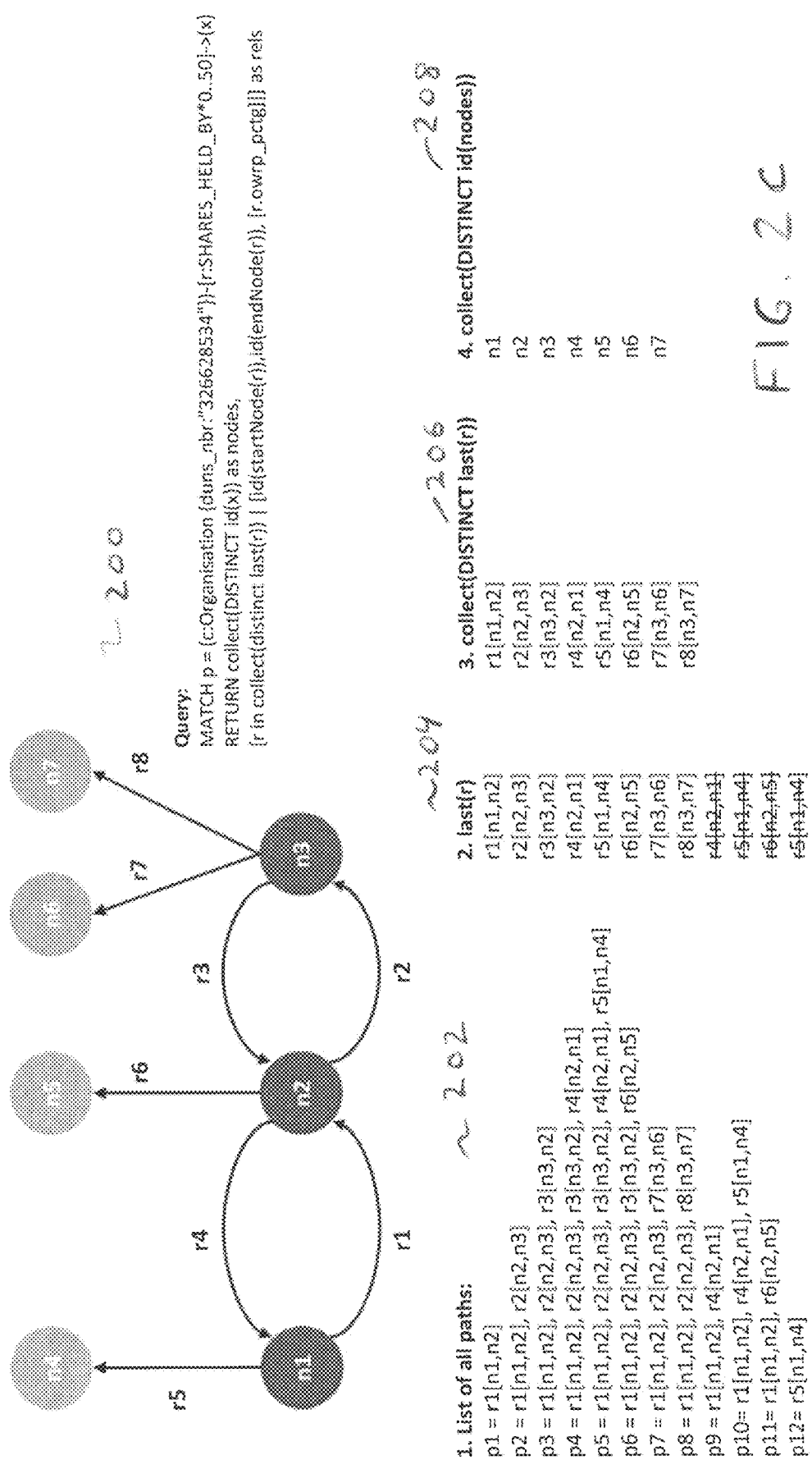
FIG. 2C illustrates compiling a list of all paths in the structure.

FIG. 2C shows that when an entire structure 200 has been built, a list 202 of all possible paths in the structure can be compiled. A MATCH query can be run (as disclosed in U.S. Pat. Nos. 6,026,398 and 7,392,240). The last step 204, what is collected 206 and what nodes are distinct 208 are all listed. In last step 204, the last four entries are not needed because these are redundant based on an ownership loop being present.

Figure 2D:
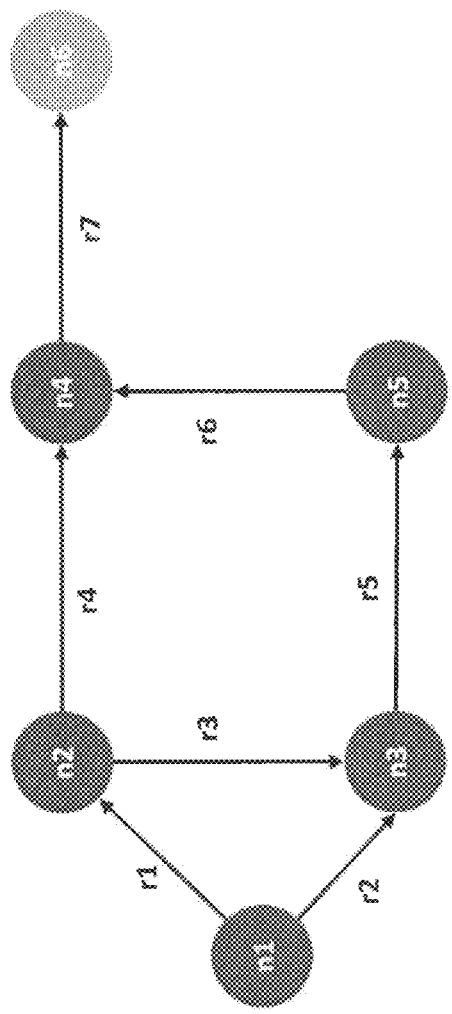
FIG. 2D and FIG. 2E illustrate the manner in which a depth calculation is made.
Figure 2E:
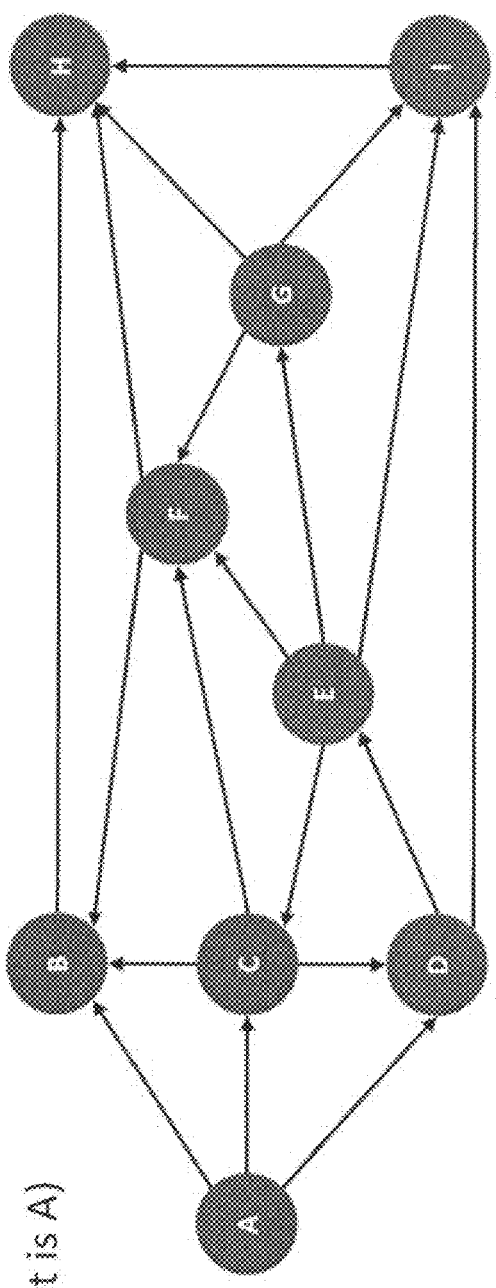

Referring to FIG. 2D and FIG. 2D, a calculation of the depth of the structure is performed. The depth indicates how many vectors on the graph are required to traverse from the target to end point nodes. In each case illustrated, a table is generated.

Referring to FIG. 3, the logic for linear structures is as follows:

1. Start from the T (target Duns)
2. Calculate the Direct ownerships assign any missing ownership % to Unknown P and make total direct ownership=100%
3. Any Corporate that has the direct ownership of T (such as C2) and also being owned by another Corporates or persons (such as C4 or P1), the indirect ownership of such Corporate or person needs to be calculate through their level of direct ownership. Also assign any missing ownerships to Unknown P.
4. If there is still C left as the indirect owner at upper level, repeat the process 3 until all the ownership are directed to Pi or unknown P
5. Aggregate the direct and indirect ownership of each Pi to get Pi's total ownership on T. Pi is the ultimate beneficial owner.
6. Aggregate the direct and indirect ownership of unknown P to get unknown P's total ownership on T. this is the unallocated ownership for T which means there is no enough data to discover the 100% ownership.

Example 1

$$T = 10\% \; C3 + 90\% \; C2 = 10\% \; C3 + 90\%(40\% \; C4 +$$
$$20\% \; C5 + 30\% \; P1 + 10\% \; UnknownP)$$
$$= 10\% \; C3 + 90\%(40\%(20\% \; C7 + 80\% \; C8) +$$
$$20\% \; C9 + 30\% \; P1 + 10\% \; UnknownP)$$
$$= 10\% \; C3 + 90\%(40\%(20\% \; C7 + 80\% \; C8) +$$
$$20\%(10\% \; C12 + 90\% \; C10) + 30\% \; P1 + 10\% \; UnknownP)$$
$$= \ldots = \% \; P1 + \%P2 + \% \; UnknownP$$

For looping ownership structures the following general logic applies.

1. Start from the T(target Duns)
2. Calculate the Direct ownerships assign any missing ownership % to Unknown P and make total direct ownership=100%
3. Any C has the direct ownership needs to be calculate through upper level indirect ownerships, assign missing ownerships to Unknown P
4. If there is still C left as the indirect owner at upper level, repeat the process 3 until all the ownership are directed to Pi or unknown P Continuing on with reference to FIGS. 4A, 4B and 4C:

Identify all of the Loop Points and Looping structures:

During 3, When an upper level shareholder Ci is entirely or partially owned by any Ci-n or T (any Ci-n or T that Ci owns its shares directly or indirectly), then Ci-n Ci loop is recognized, Ci-n is tagged as the loop point.

T owns shares of a upper level entity C2, so T is identified as a Loop Point and T/C2 marked Continue calculating the indirect ownership as described in 3 except that whenever a loop point (Ci-n) is observed, there is no need to calculate/break through the (Ci-n); leave it as if it is a P in the chain until Ci is later de-looped.

C2 owns shares of an upper level entity C3, so C2 is identified as a Loop Point and C2/C3 marked.

FIG. 4A, FIG. 4B and FIG. 4C illustrate logic for determining loop ownership structure.

In the query rule illustrated in FIG. 4D, the controlled ownership calculation, includes a loop is the product of all Xn, where X is a relationship link from one DUNS to a corporate shareholder. Yn is a relationship link from a corporate shareholder to an earlier-visited DUNS that holds ownership in that corporate shareholder. The shareholder percent Yn is excluded from the shareholder ownership calculation, and the link back to a previously-visited node is ignored.

In FIG. 4D, d=Multiplier=0.01. UBO Indirect Ownership=dX1*dX2*dX3*dX4*100. Setting d equal to 0.01 serves to round out less significant ownership stakes, which are not of significance for complying with regulatory requirements. Further, total ownership is normalized to 100 percent.

Figure 4E:
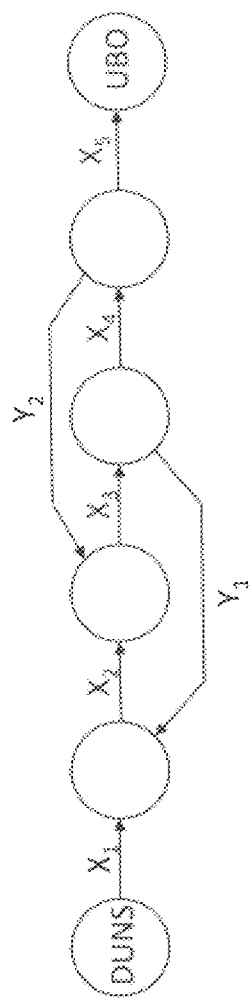
FIG. 4E illustrates a query rule for a second case involving an ownership loop.

In FIG. 4E, the path that describes Indirect Ownership includes multiple loops. In each of these cases, the looping ownership percent Yn is ignored. Again, d=0.01 and UBO Indirect Ownership=dX1*dX2*dX3*dX4*dX5*100

Figure 4F:
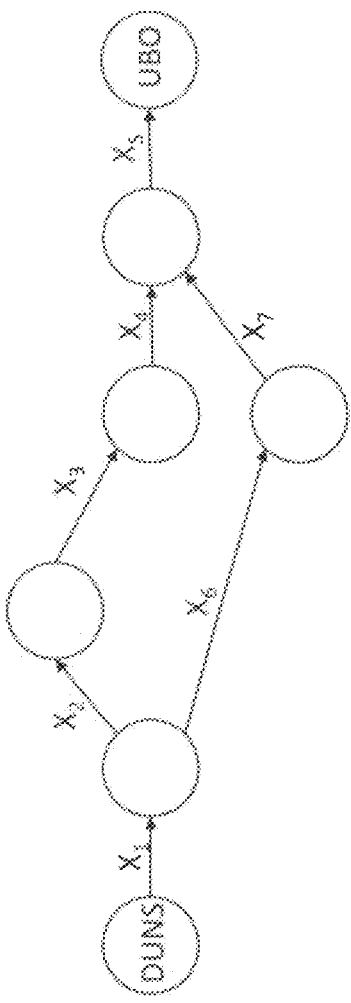
FIG. 4F is a case where calculation of indirect ownership includes multiple paths.
Figure 4H:
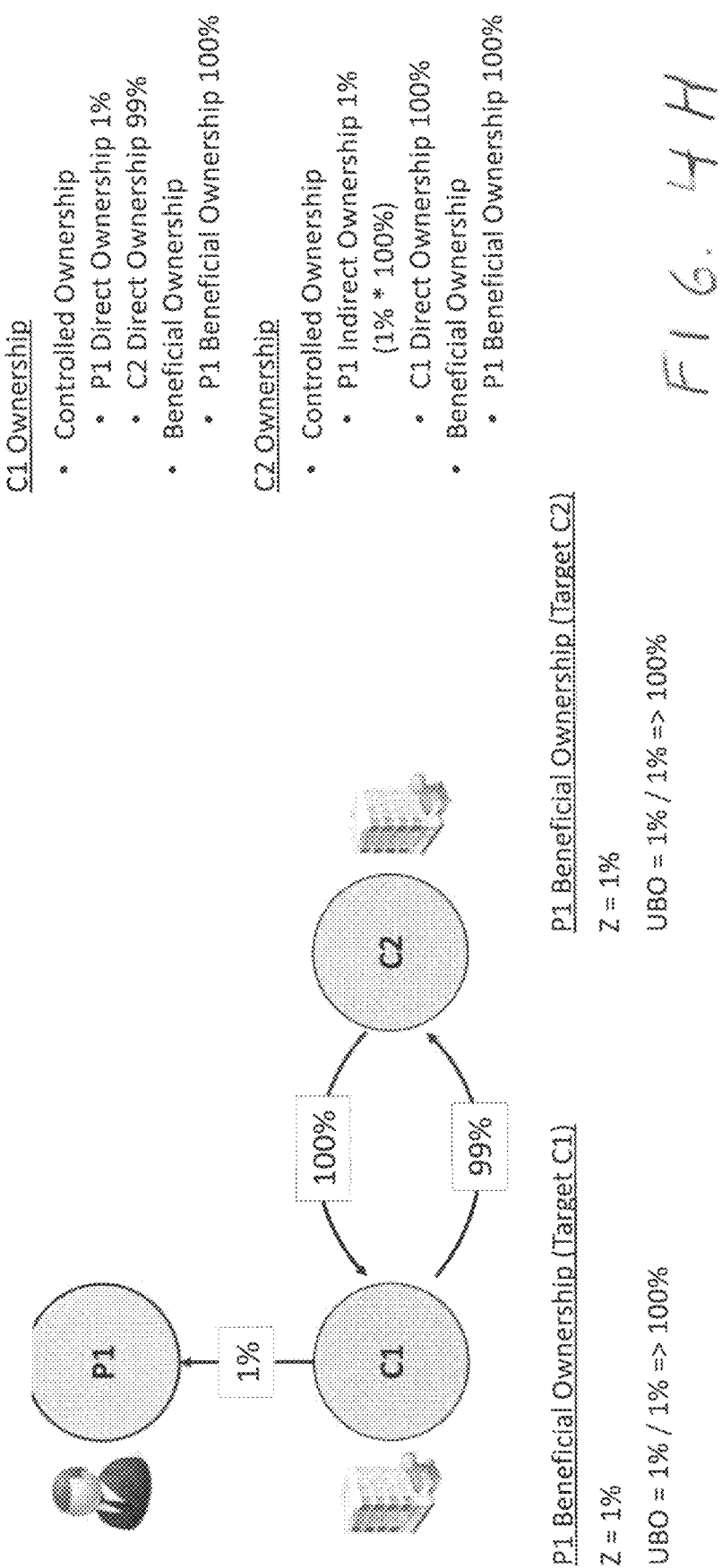
Figure 4I:
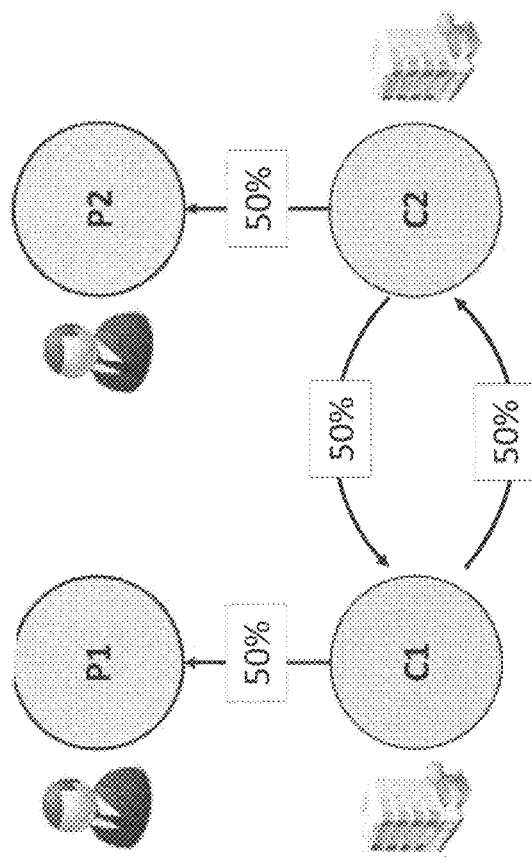
Figure 4J:
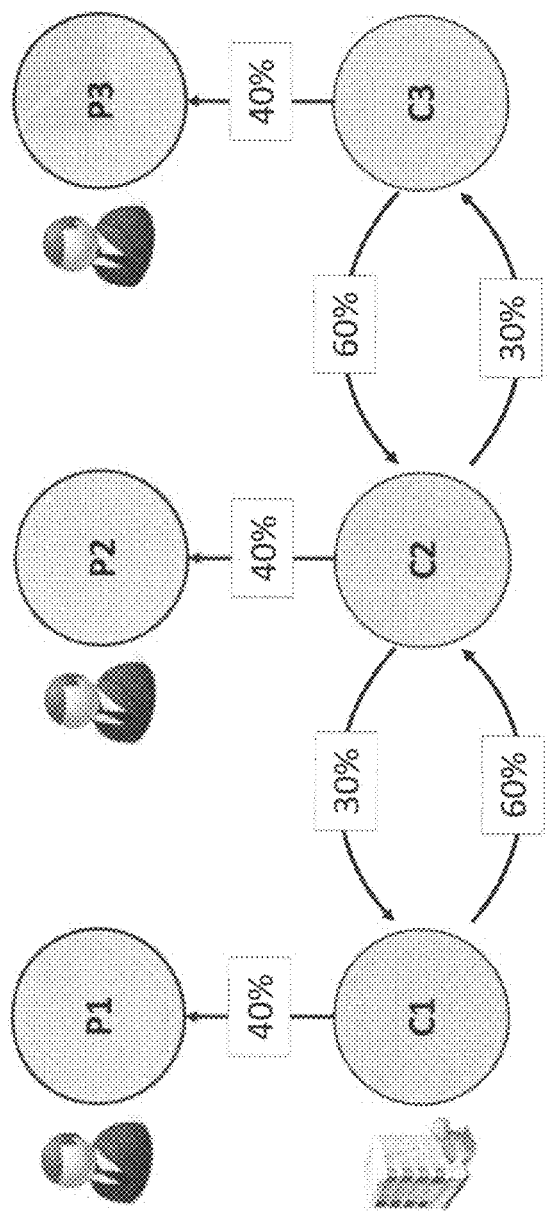
Figure 4L:
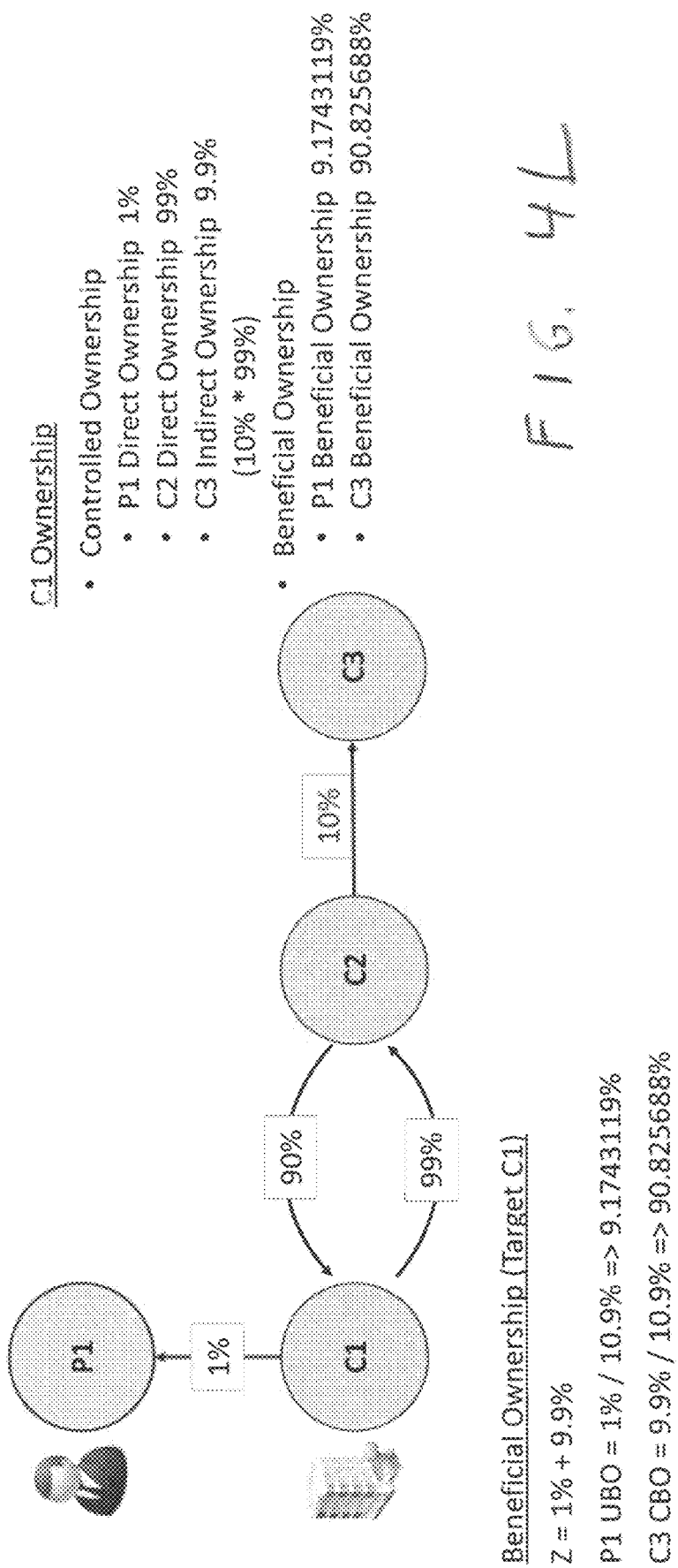
Figure 4N:
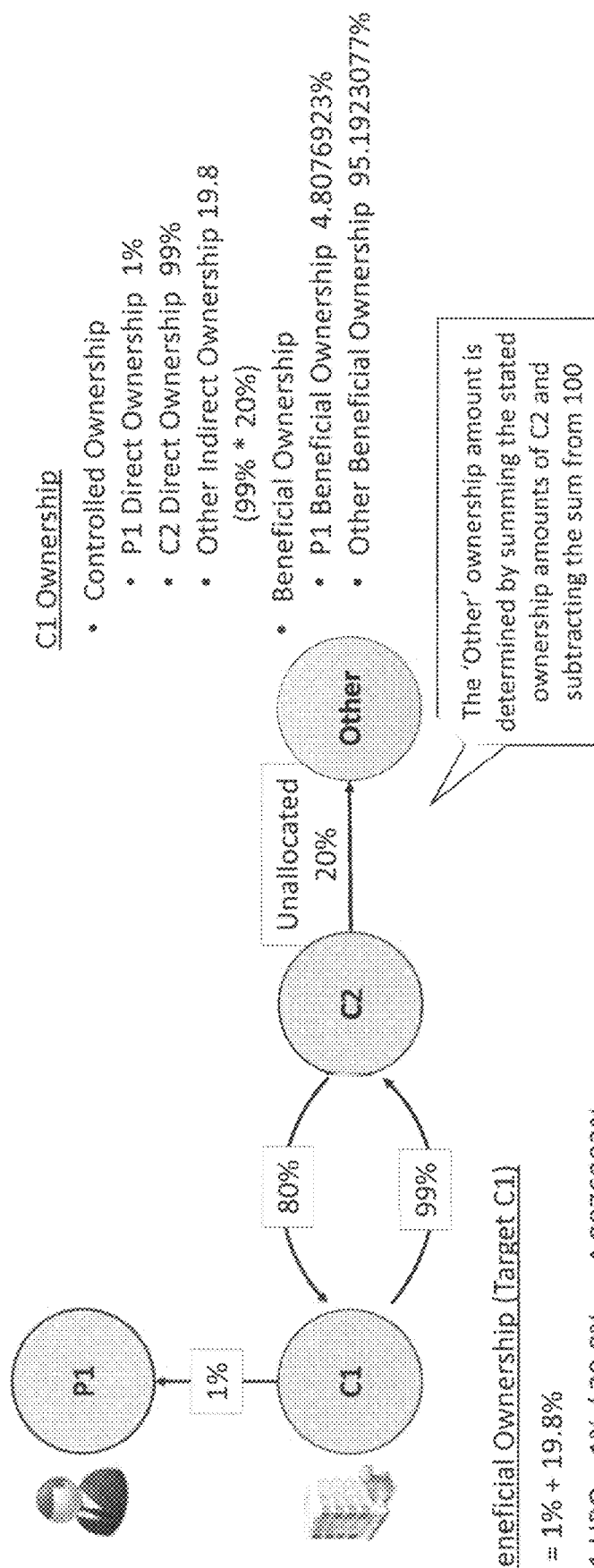

In FIG. 4F, is a case where calculation of indirect ownership includes multiple paths. Again, d=0.01. UBO Indirect Ownership=dX1*((dX2*dX3*dX4) (dX6*dX7))*dX5*100. In this case, the multiple paths converge on a corporate shareholder for which the UBO has direct ownership. This rule does not cover the case where the UBO has two or more different identifiers.

FIGS. 4G through 4N illustrate further rules or patterns for performing beneficial ownership calculations. Although other calculation rules or patterns may be developed, there are a total of 19 disclosed herein.

Additional considerations that are of significance are including all persons' direct or indirect ownership (all UBOs), including any 'leaf' corporate owner's ownership in total ownership, wherein a "leaf" has no allocation of ownership to another. (all CBOs), aggregating multiple, separate paths to a single owner's aggregate ownership (single ID), and include any unallocated corporate ownership % (allocated<100%) as ownership by the corporate owner and including it in total ownership.

Continuing on with reference to FIGS. 5A and 5B:

6. Decide the furthest loop and loop point: upon completion on the indirect ownership calculation(face value), the system need to determine which loop point is the furthest loop point toward T: in this case, above C2, there is no more loop point, so C2 is the furthest loop point. The C2/C3 loop is the furthest loop.

When the structure is more complex with looping structures in multiple linear directions the furthest loop point is decided by:

A. Line up the loop point by how far it is from T, and tag the furthest loop point for each line
B. compare all loop point to see if there is any furthest loop point from other lines is further than the furthest loop point in reviewed the line.
C. By comparing all lines, we can find out which one is the furthest loop point.

Figure 7A:
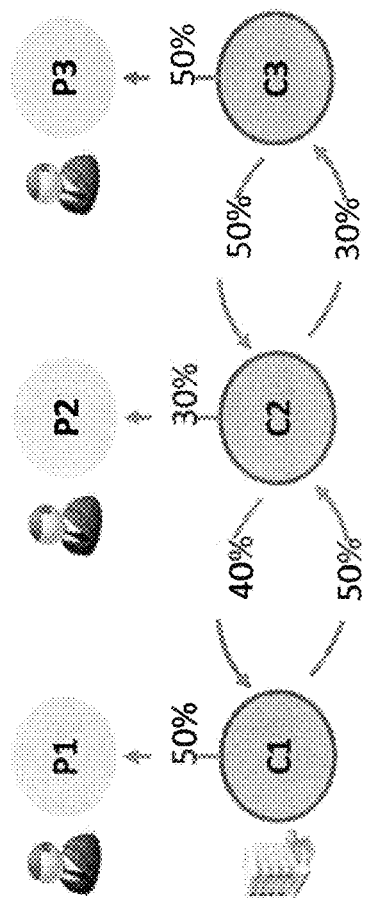
FIG. 7A and FIG. 7B an example of a de-loop calculation.

Continuing on with reference to FIG. 6:

7. Self-ownership calculation: The defined de-loop calculation is used to de-loop the furthest loop and calculate the self-ownership of the loop point.
8. Use the self-ownership of each loop point and the Pi formula to calculate the real/loop adjusted indirect ownership for each P.
9. Use the results from the de-loop calculation to calculate the next furthest loop point's self-ownership.
10. Repeat point 10, until self-ownership of all loop points is calculated.
11. Aggregate the direct and real/loop adjusted indirect ownership of each Pi to get Pi's total ownership on T. Pi is the ultimate beneficial owner.
12. Aggregate the direct and real/loop adjusted indirect ownership of unknown P to get unknown P's total ownership on T. This is the unallocated ownership for T which means there is no enough data to discover the 100% ownership FIG. 7A illustrates a looping ownership structure.

Figure 7B:
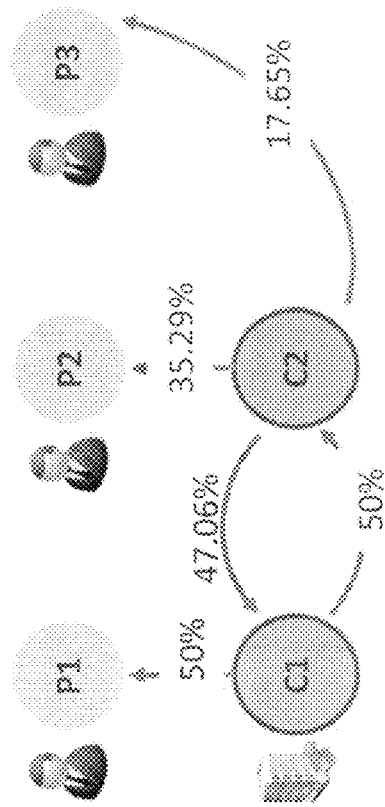

FIG. 7B illustrates the results of the first step of the de-loop calculation. Once the self-ownership of C2 has been determined, the re-allocation of the share ownership to P3, P2 and C1 can be performed.

De-looping starts with the furthest loop point. Each time a loop point is de-looped and self-ownership is calculated, the level ownership for each of the other owners will be affected by the ratio of 1/(1-Ci self-ownership).

FIG. 7 illustrates why calculation through a loop point once it is identified is not proper. Once a C is identified as a loop point, if it shows up again in a higher level indirect ownership calculations (this means C is also a shareholder of a higher level company), the system should leave this loop point as if it is a P. There is no need for further break down by ownership of P. If break down the ownership on a loop point is continued, an endless circle of calculation will be entered (as illustrated in the rectangles 90 and 92 of FIG. 8). The self-ownership of the loop point is calculated once all further loops have been de-looped.

In the example of FIG. 8, T is identified as a loop point; therefore, the system should not break down ownership or calculate through the T in rectangle 90. Otherwise, the pattern shown in rectangles 90 and 92 will be endlessly repeated.

Figure 9:
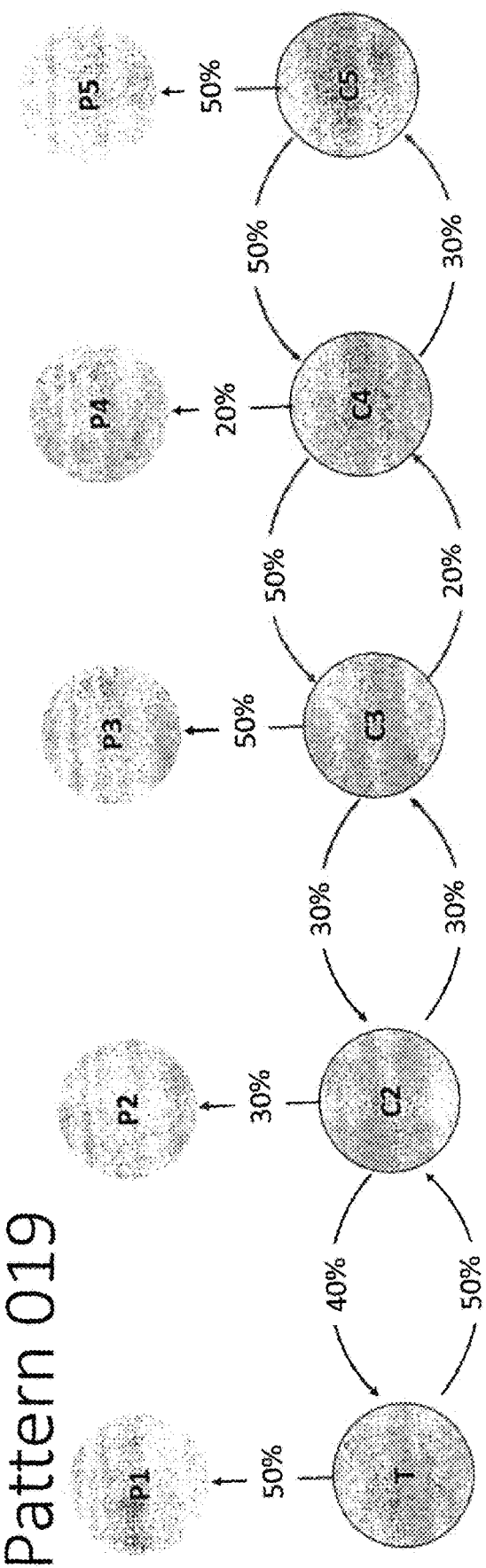
FIG. 9 is an example of an ownership structure.
Figure 1D:
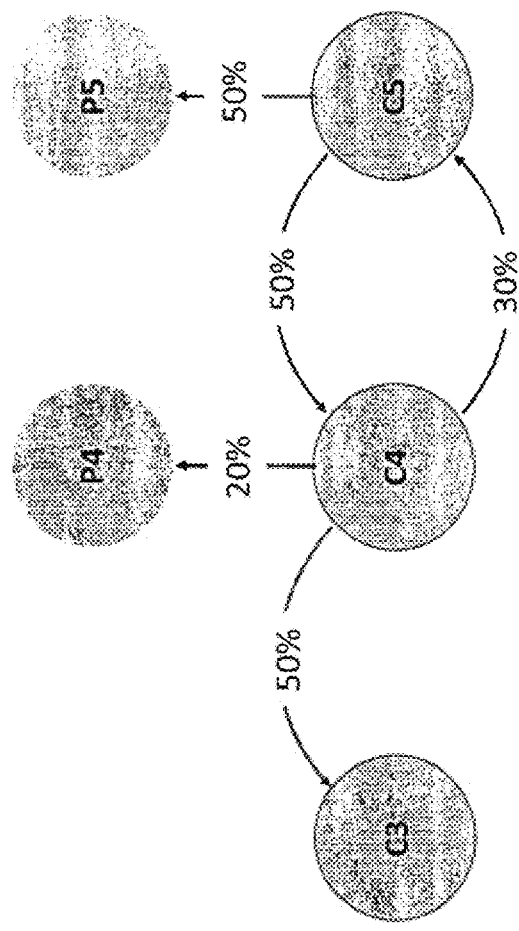

FIG. 9 is an example of a looping ownership arrangement.

FIG. 10 shows the first part of the structure of FIG. 9 to be de-looped in isolation. The goal is to understand how much C4 owns of itself to effectively remove C5 and attached P5 as a percentage owner of C4. C4 effectively owns 15% of itself.

Figure 11:
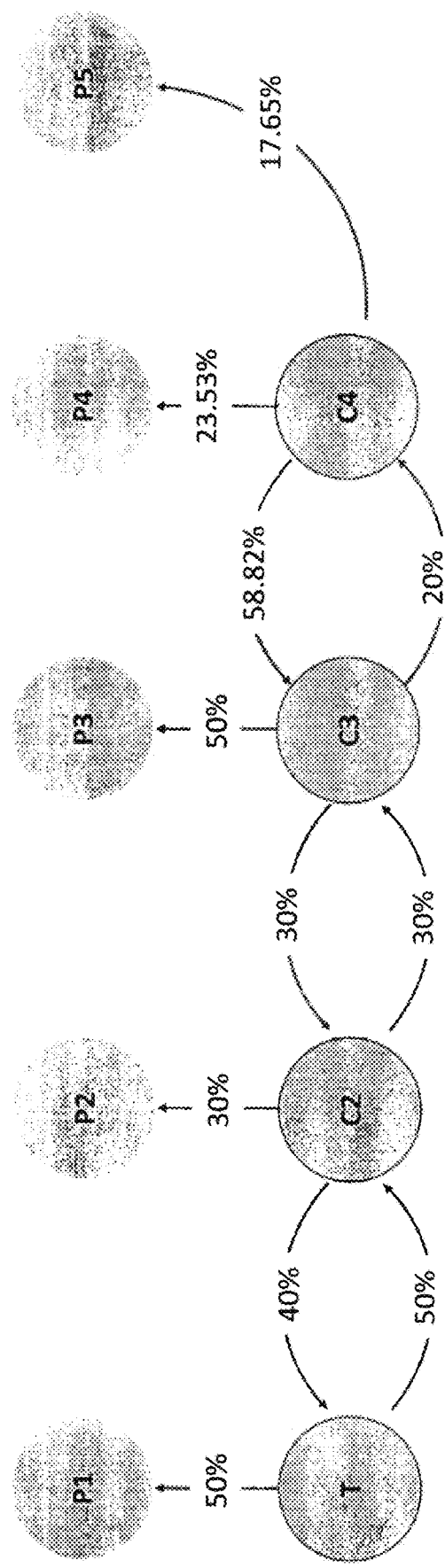
FIG. 11 and FIG. 12 illustrate analysis of a second part of the structure of FIG. 9.

FIG. 11 shows the results of the first de-looping structure in FIG. 10 integrated into the entire looping ownership arrangement originally described in FIG. 9

Figure 12:
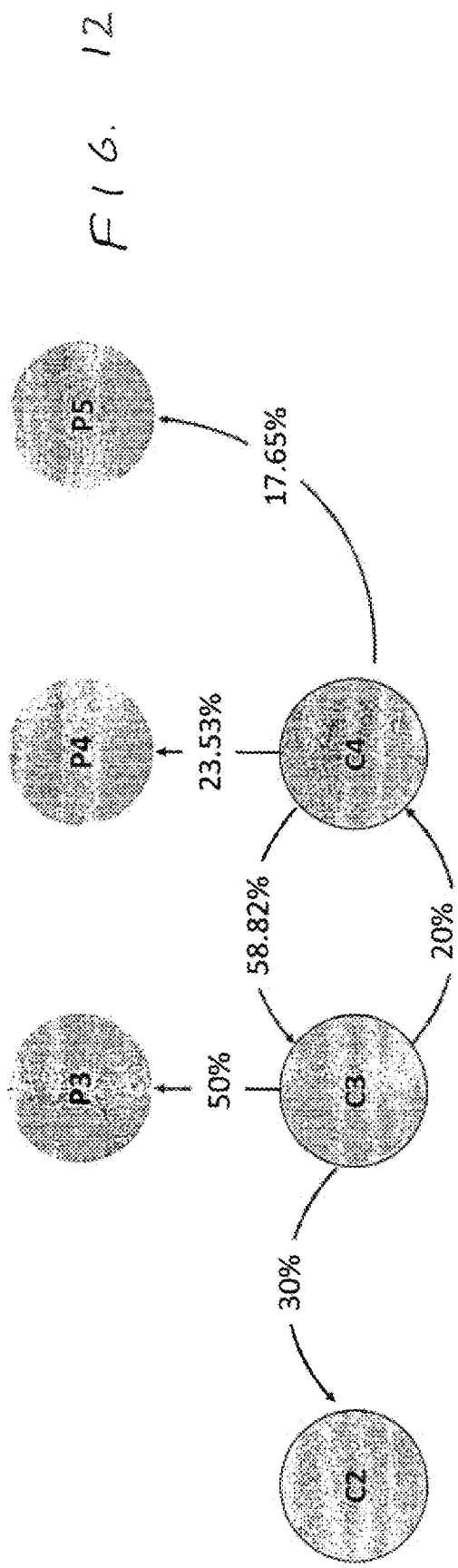

Continuing in FIG. 12, associated with a second part of the structure to be de-looped in isolation, P5 ownership of C4 has been defined. An understanding how much C3 owns of itself is needed to effectively remove C4 and attached P5 and P4 as a percentage owners of C3. C3 effectively owns 11.76% of itself.

Figure 13:
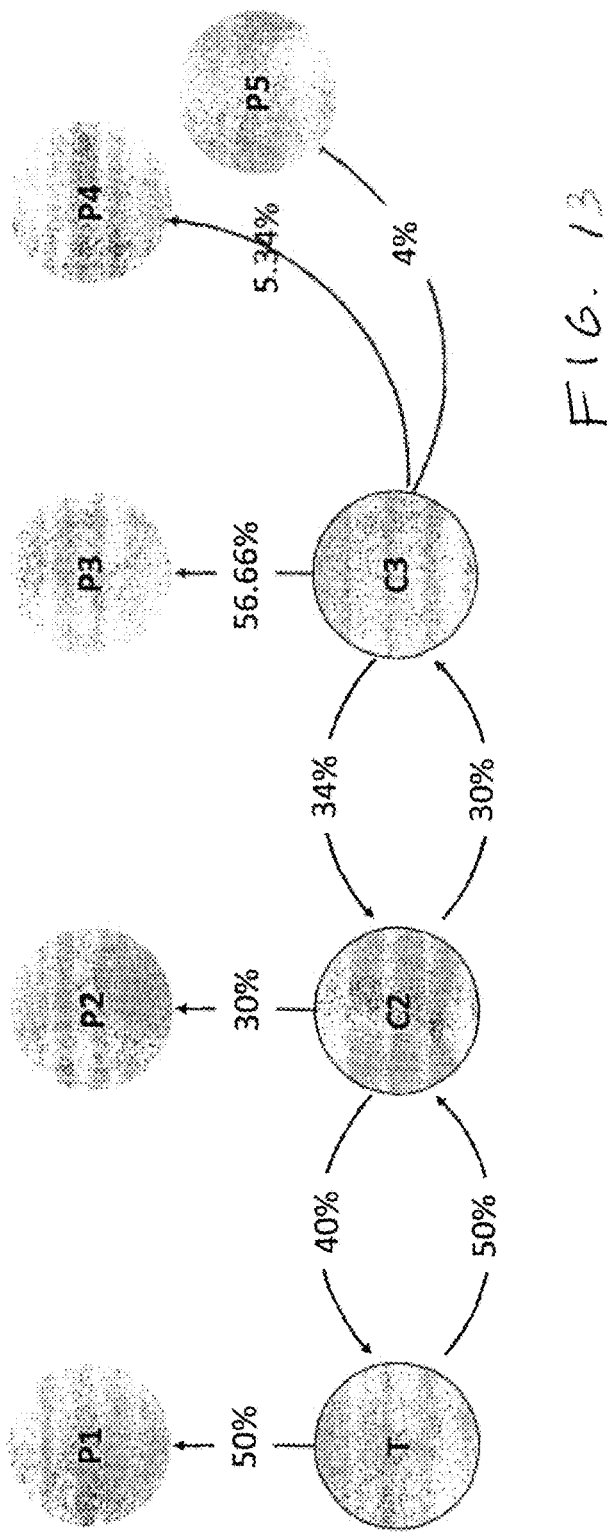
FIG. 13 and FIG. 14 illustrate analysis of a third part of the structure of FIG. 9.

FIG. 13 shows the results of the second de-looping structure integrated in FIG. 12 into the entire looping ownership arrangement originally described in FIG. 9.

Figure 14:
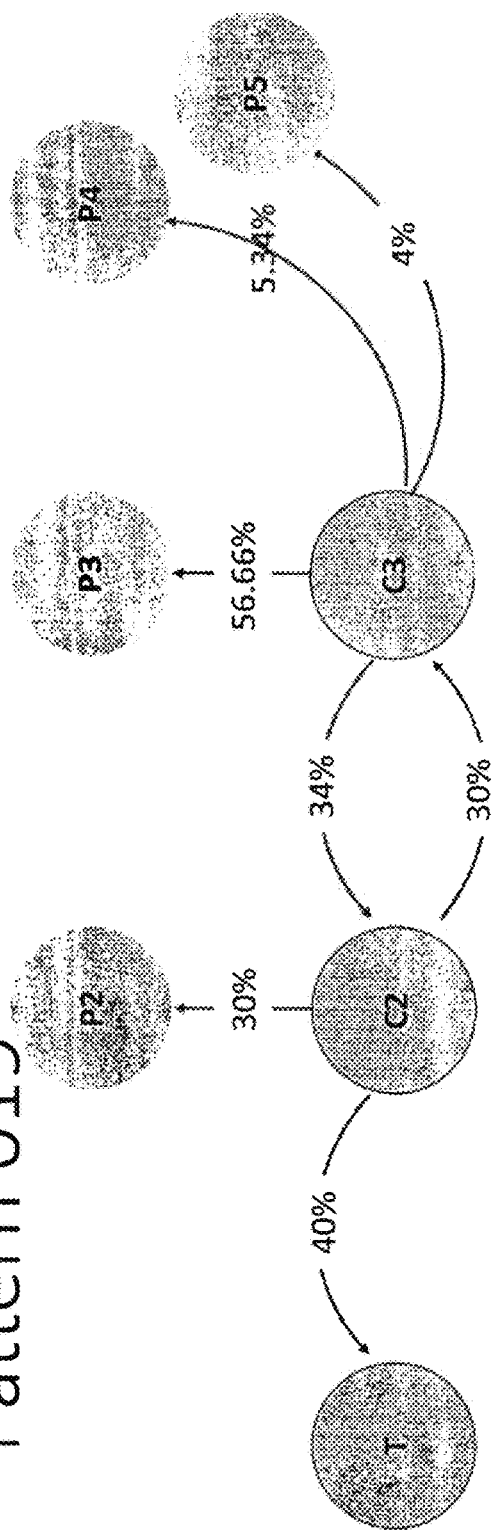

In FIG. 14, a third part of the structure to be de-looped is shown in isolation. P5 and P4 ownership of C3 has been defined. Understanding how much C2 owns of itself effectively removes C3 and attached P5, P4 and P3 as a percentage owner of C2. C2 effectively owns 10.20% of itself.

Figure 15:
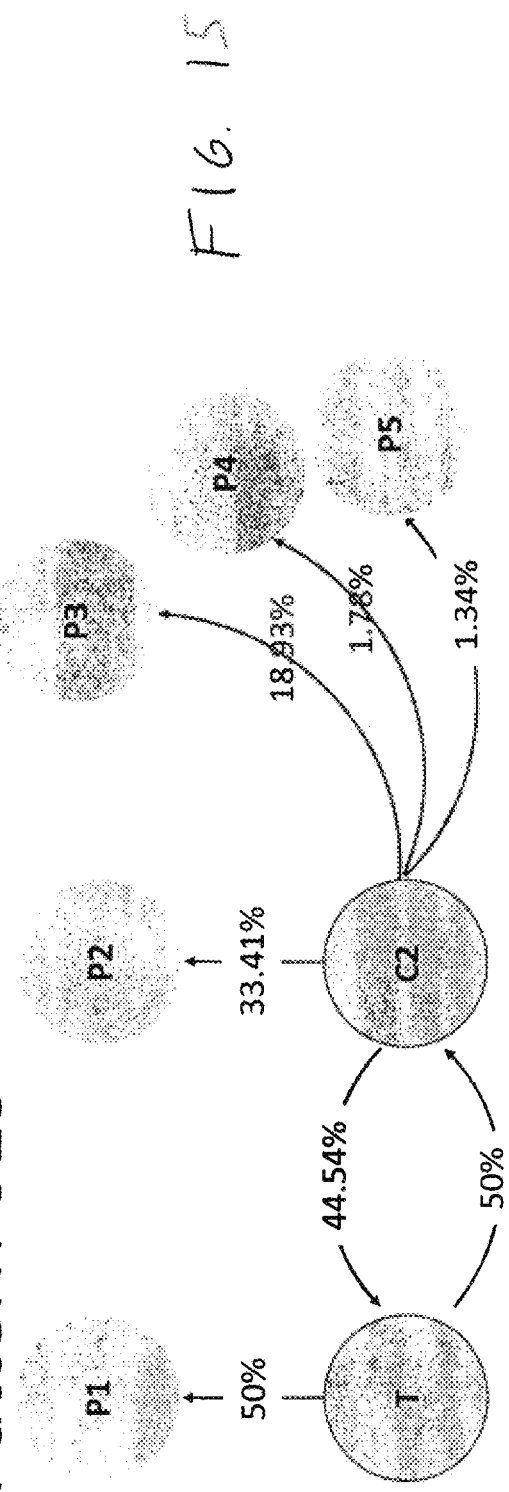
FIG. 15, FIG. 16 and FIG. 17 illustrate the final determination of the ownership of the target in FIG. 10.

FIG. 15 shows the results of the third de-looping structure integrated in FIG. 14 into the whole looping ownership arrangement originally described in FIG. 9.

Figure 16:
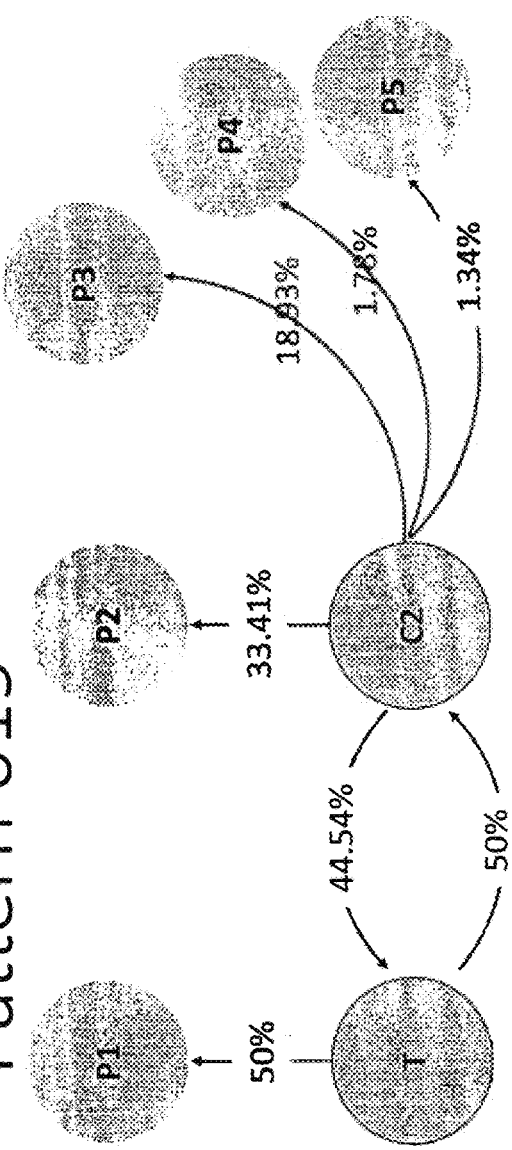
Figure 17:
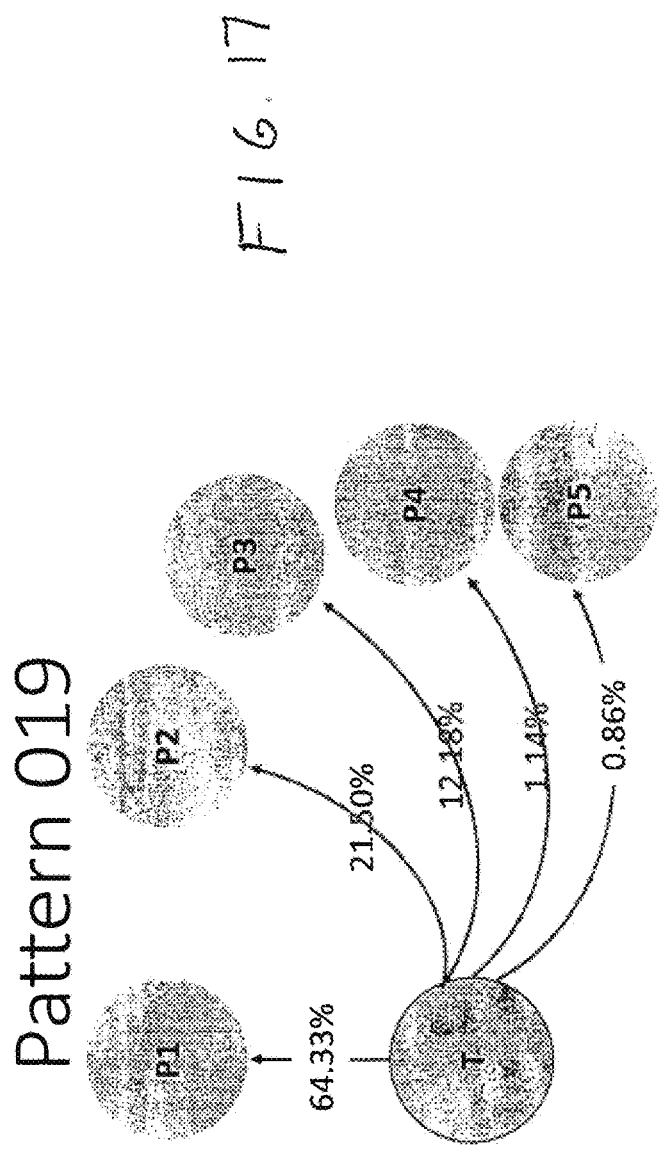

Referring to FIG. 16, it is possible to de-loop down to the target Understanding how much T owns of its self effectively removes C2 and attached P5, P4, P3 and P2 as a percentage owner of T. T effectively owns 22.27% of itself FIG. 17 shows the full de-looping of the ownership structure and the beneficial ownership of each P.

Figure 18:
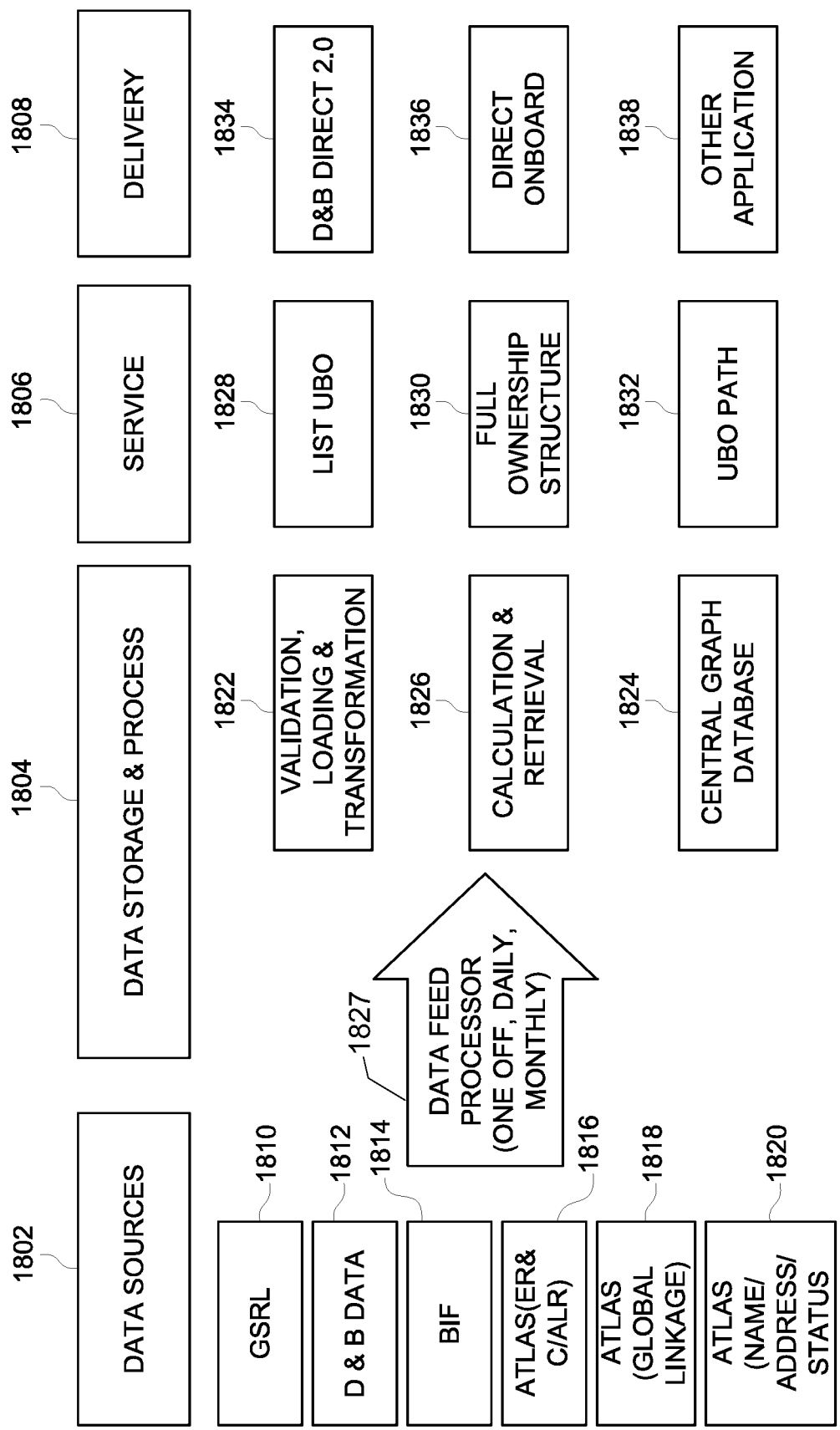
FIG. 18 illustrates a four section structure for a system as described herein.

FIG. 18 illustrates a structure having four sections: Data Sources 1802, Data Storage and Process 1804, Service 1806 and Delivery Layer 1808.

Data Sources 1802: The data is collected from Data Source layers. There are either flat or XML files from these applications that are placed into a landing zone in the network from where scheduled jobs acquire the data and place it into a Data Storage layer within Data Storage and Process 1804. Data sources are GSRL 1810, processed D & B data 1812, BIF 1814, ATLAS (ER&C/ALR 1816, ATLAS (Global Linkage) 1818 and ATLAS (Name/Address/Status).

Data Storage & Process 1804: The data once placed into the Data Storage layer within Data Storage and Process 1804, is validated, transformed and loaded, at 1822, into a Neo4J Central Graph Database 1824. Calculation and retrieval of data is performed at 1826.

A data feed processor, represented at 1827, fees data from Data Sources 1802 to Data Storage and Processes 1804 at selected times, daily, weekly or monthly, as required.

Services 1806: An API is used in the service layer to provide the UBO Calculations Services or Utilities to other downstream systems that require access to the same. Outputs include a list of UBO's 1828, a full ownership structure 1830, generally displayed as a "map" with the entities represented as nodes and the relationships as lines connecting the nodes, and UBO paths 1832 (generally displayed as or on the "map".

Delivery: Delivery Layer 1808 can be performed through any application which requires UBO related information. Examples shown include D & B Direct 1834, Direct Onboard 1836, and other applications 1838.

Figure 19:
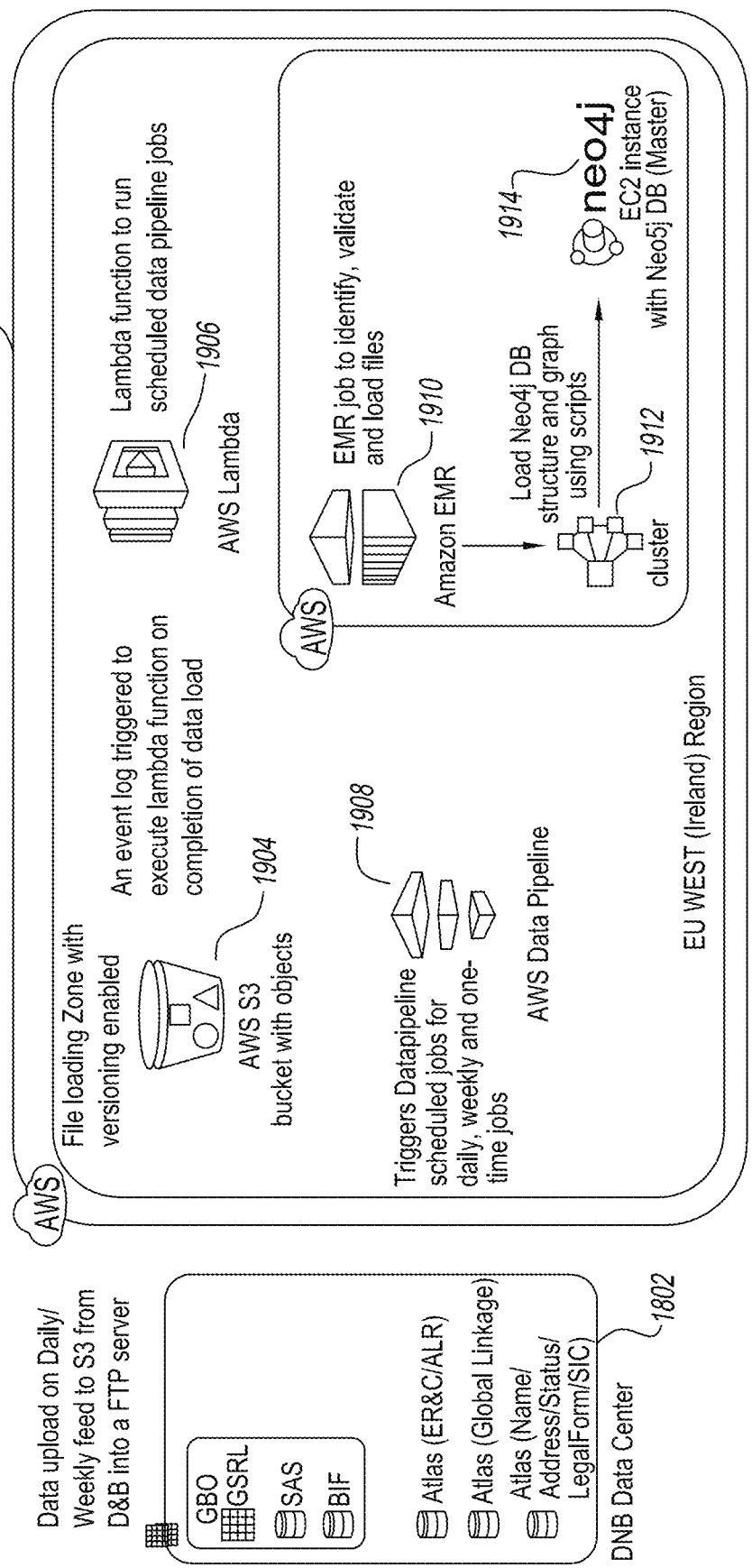
FIG. 19 illustrates an embodiment of a data loading architecture of the system described herein.

FIG. 19 illustrates an AWS data loading architecture 1902. The components include:

Data center: This includes the Data Sources of FIG. 1802.

The data sources 1802, as described above with respect to FIG. 18, push the data files to a Secure File Transfer Protocol (SFTP) as per the frequency agreed (daily, monthly and one-time). A scheduler polls for the files in STP location, compresses the data files and loads the files onto AWS S3 1904 using scripts.

Amazon S3 1904 is an input data storage for daily, monthly, one time data feed files from a data center through scripts. Different features of S3 can set appropriate permissions, read and write access and authenticated user read access. The following lists the file structure, which can be used for individual folders for Year (2016/2017 . . . ), months (Jan/Feb/ . . . Dec), date (01, 02, 03 . . . 31) & time (01, 02 . . . 24) inside the folders, as per the frequency of the different files consumed (i.e. DD or MM).

On completion of a data load, an event log is triggered to execute, at 1906, Lambda to run scheduled data pipeline jobs.

AWS Data Pipeline 1908 is a web service used to automate the movement and transformation of data. In the UBO AWS environment, AWS Data Pipeline 1908 jobs are used to access the daily/one-time data files from AWS S3 1904 on a predefined hourly basis and then run the Amazon Elastic Map Reduce (Amazon EMR 1910 cluster 1912 to load the data onto Neo4j database 1914.

Amazon Elastic Map Reduce 1910, scheduled daily, weekly and for one-time jobs, is triggered to identify, validate and load the files to Neo4j database 1914.

The Neo4j database 1914 is a highly scalable, native graph database purpose-built to leverage not only data but also its relationships. Neo4j's native graph storage and processing engine deliver constant, real-time performance, helping enterprises build intelligent applications to meet today's evolving data challenges.

With the arrangement of FIG. 19, data can be delivered in many formats and languages across the world. By using data stewardship rules, the data is normalized, in order for it to be maintained in the graph database as logical data that can establish relationships. Company names, address data, share percentages, dates of birth etc. are all held in a common standard with these data governance rules. Because data can be received at any time, the system can support monthly, weekly, daily or hourly feeds of new information from more than 200 countries.

An EC2 (Elastic Compute Cloud) instance is provisioned in AWS VPC (Virtual Private Cloud) with Neo4j database deployed. AWS EC2 facilitates virtual computers on cloud to run users applications on-demand basis and allows scalable deployment. A VPC (Virtual Private Cloud) is a private & secure network established between D&B and AWS ensuring complete security and privacy for users. Horizontal scaling of servers enables the management of the tremendous growth in data that is required to perform multiple calculations for multiple requests.

Server Naming Conventions:

In LBO Dev AWS Environment, for easy identification and prevent the confusion of the architecture all AWS components will be named accordingly. For this usage purpose, we will use AWS Tagging feature. Below are the naming convention details.

"<DNB Project>-<COMPONENT>-<DEPLOYMENT>-<TYPE>-<RUNNINGNUMBERS>"

DNB Project—To represent which DNB project. The possible values are "UBO".

COMPONENT—To represent the AWS components. The possible values are:

W→Windows: L→Linux; ELB→ELB (public); ILB→ELB (private) VPC→VPC, SNT→Subnet; RTB→Route Table, IGW→Internet Gateway; SG→Security Group;

DEPLOYMENT—To represent the environment, the server belongs to. The possible values are: DEV→Dev; STG→Staging; PRD→Production; MGT→Management Servers TYPE—To represent the purpose of the AWS component. The possible values are: WEB→Web Server; APP→App Server BS→Bastion Server; PR→Private Route; NR→NAT Route; IR→Internet Route; LB→ELB RUNNINGNUMBERS—A running number to represent the number of the Instance within a specific Server type.

Figure 20:
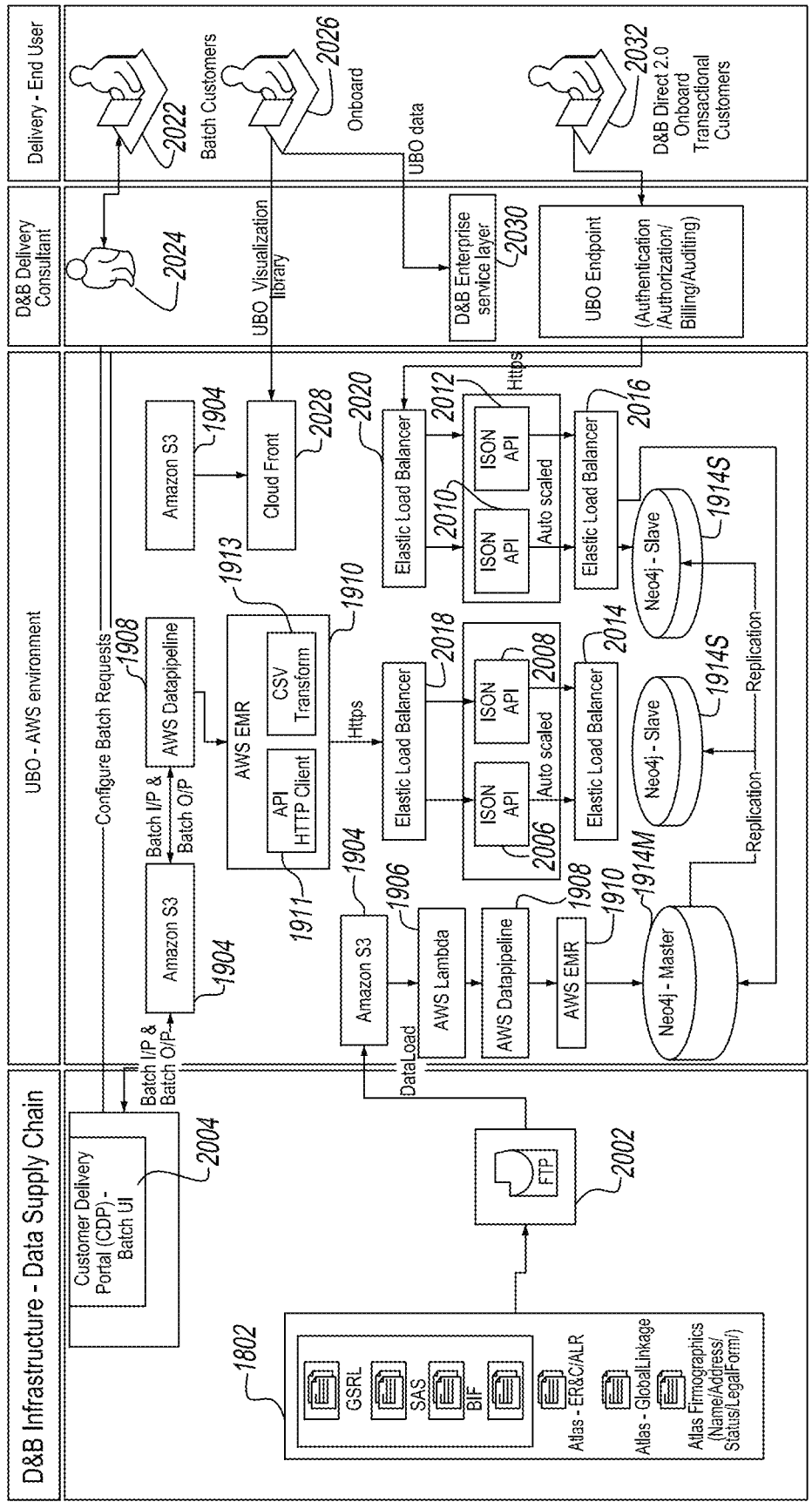
FIG. 20 is a high level architectural diagram of system for performing the calculations described herein.

FIG. 20 is a high level diagram of a system for performing the beneficial ownership calculations in accordance with the method disclosed herein. The data loading architecture of FIG. 19 is utilized therein. Data files from Data Sources 1802 is loaded to Amazon S3 1904, as described above via FTP, as represented at 2002. FIG. 20 also illustrates the end to end flow of how a customer or other user of the system can retrieve the calculated beneficial ownership.

The customer can request information on multiple businesses (as many as 1 million companies in one request) or can ask for information on a single business.

In a Customer Delivery Portal 2004, loaded with multiple user requests delivered as a file via a secure FTP, records are matched to the unique DUNS number to ensure uniqueness of the record before being sent for calculation of the beneficial owners. The data for that record within the graph database is located. Amazon S3 1904, AWS data pipeline 1908 and AWS EMR 1910 are used to input the requests or queries. AWS EMR 1910 an HTTP client 1911 and CVS transform 1913.

The requests and responses are managed by the JSON API's 2006, 2008, 2010 and 2012. Elastic load balancers 2014, 2016, 2018 and 20120 ensure that there is enough capacity in the system to handle as many requests as possible. For example, it is preferred that the results of small calculations are delivered in under 300 milliseconds, results of a medium size calculation, with more than 10,000 relationships, are delivered in approximately one second and a large calculations, with more than 100,000 relationships be completed in ten seconds. Data returned in these time frames allows the user can make instant decisions on whether transactions that required regulatory scrutiny on business ownership can be allowed to go forward, based on considerations of beneficial ownership.

As described in detail above, the calculations required to derive beneficial ownership are performed in Neo4j graph databases, where the results are temporarily stored before vending to the requestor. A master Neo4j graph databases 1914M can be replicated to provide as many slave Neo4j graph databases 1914S as needed in order to deliver the information to the user in a timely manner. The Neo4j graph databases are cloud based, allowing for automatically managing the "spinning up" of more or fewer instances of slave Neo4j graph databases 1914S, and JSON APIs, to provide the required capacity or latency, depending on current traffic.

The answers or results of the calculation include firmographic data on the entities, a list of direct, indirect, controlling and beneficial owners 1828, and as noted above, a full ownership structure 1830, generally displayed as a "map" with the entities represented as nodes and the relationships as lines connecting the nodes, and UBO paths 1832, generally displayed as or on the "map". This data is sent to the user to view on a display screen as, for example, associated with a computer as illustrated and described with respect to FIG. 1. The data could also be provided in XML format for use in a customer's proprietary system to display or use in an automated decision engine, or one of the D&B products and services where the data is rendered within UI/UX using visualization software. For example, as shown in FIG. 20, end users may be a customer 2022, who makes inquiries in batches, possibly with the assistant of a consultant 2024. An Onboard customer 2026 can access a UBO visualization library maintained in a cloud front 2018. The user 2026 can access UBO data via an enterprise service layer 2030. A Direct 2.0 Onboard transactional customer 2032 can be serviced via UBO Endpoint for authentication, authorization, billing and auditing.

The system of FIG. 20 can support, for example, beneficial ownership calculations for one million business records in a time of 2 hours 40 minutes. This compares extremely favorably to the estimated average time of 15 minutes, as noted above, to calculate the beneficial ownership for a single business by conventional techniques.

In additional to multiple records, the system of FIG. 20 also supports a single request, as for example, via an online portal or an API that can be coded into the proprietary systems of an organization.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A method for determining the extent of beneficial ownership of a target business, comprising:
   populating a database wherein businesses and ownership relationships between the businesses are represented by nodes and links;
   querying the database to establish related ownership links;
   analyzing the query to determine ownership loops;
   de-looping the ownership relationships; and
   calculating the percentage ownership of each of the beneficial owners of the target business based on de-looped ownership relationships;
   wherein determining the extent of beneficial ownership of the target business further comprises:
   a calculating direct ownerships for the target business;
   b. assigning any missing ownership percentage to an unknown entity P so that the total direct ownership is one hundred percent;

c. for any entity that has direct ownership, calculating upper level indirect ownerships and assigning any missing, ownership to unknown entity P;
d. for any remaining entity that is still an indirect owner at an upper level, repeating step c until all ownerships are directed to at least one other entity Pi or unknown entity P;
e. identifying, all loop points and looping structures;
f. continuing to calculate the indirect ownership as in step c;
g. determining the furthest loop and loop point from the target business;
h. performing a self-ownership calculation by de-looping the furthest loop to calculate self-ownership of the furthest loop point;
i. using the self-ownership of each loop point to calculate a real/loop adjusted indirect ownership for each unknown entity P;
j. using the results from the de-looping to determine the self-ownership of a next furthest loop point from the target business;
k. repeating step j until self-ownership of all loop points is calculated;
l. aggregating direct and real/loop adjusted indirect ownership of each Pi to determine total ownership of the target business by each Pi as an ultimate beneficial owner; and
m. aggregating the direct and real/loop adjusted indirect ownership of the unknown entity P to determine unknown total ownership of the target business by the unknown entity P, as an unallocated ownership of the target business for which there is not enough data to determine one hundred percent ownership.

2. The method of claim 1, further comprising analyzing any linear ownership relations in the database, to calculate the percentage ownership of each of the beneficial owners of the target business.

3. The method of claim 1, wherein the database is a graph database.

4. The method of claim 1, further comprising constructing a diagram of all owners of a target business, wherein the owners are nodes, and ownership relationships are links between the nodes.

5. The method of claim 4, further comprising determining the maximum number of steps in the diagram to be traversed from the target business to the furthest owner.

6. The method of claim 4, further comprising:
searching the diagram of all owners of a target business to identify at least one of a plurality of predetermined patterns of ownership; and
using predetermined calculations corresponding to each predetermined patterns of ownership found to perform a portion of the calculating of the beneficial ownership of the target business.

7. The method of claim 1, wherein when ownership relationships are de-looped, and the loops are simple loops or contain hidden relationships, the percentage of ownership de-looped is allocated equally between entities having some percentage of ownership in an entity at an end of the loop.

8. The method of claim 1, wherein:
when ownership relationships are de-looped, and the loops are more complex than a simple loop, or where owners are undisclosed, a constant value is assigned for undisclosed entities, and
successive multiplications by the constant value are used to multiply proceeding ownerships values in the calculating.

9. The method of claim 8, wherein the constant value is used when an exact percentage of ownership of an entity is not known.

10. The method of claim 1, further comprising:
determining an entire ownership structure of the target business;
determining types of ownership relationships within the structure;
using calculations appropriate for each ownership relationship within the structure to determine an extent of beneficial ownership for that relationship; and
generating beneficial ownership data responsive to the query.

11. The method of claim 10, wherein the ownership relationships include at least one of linear, loops, self-links and hidden.

12. The method of claim 1, wherein beneficial ownership data includes at least one of firmographic data on the entities, a list of direct, indirect, controlling and beneficial owners, a full ownership structure, and ultimate beneficial owner paths.

13. An apparatus for determining the extent of beneficial ownership of a target business, comprising:
a processor;
a memory containing a series of computer readable instructions for causing the processor to execute the steps of:
populating a database wherein businesses and ownership relationships between the businesses are represented by nodes and links;
query the database to establish the related ownership links;
analyze the query to determine ownership loops;
de-looping the ownership relationships; and
calculating the percentage ownership of each of the beneficial owners of the target business based on de-looped ownership relationships;
wherein determining the extent of beneficial ownership of the target business further comprises:
a. calculating direct ownerships for the target business;
b. assigning any missing ownership percentage to an unknown entity P so that the total direct ownership is one hundred percent;
c. for any entity that has direct ownership calculating upper level indirect ownerships and assigning any missing ownership to unknown entity P;
d. for any remaining entity that is still an indirect owner at an upper level, repeating step c until all ownerships are directed to at least one other entity Pi or unknown entity P;
e. identifying all loop points and looping structures;
f. continuing to calculate the indirect ownership as in step c;
g. determining the furthest loop and loop point from the target business;
h. performing a self-ownership calculation by de-looping the furthest loop to calculate self-ownership of the furthest loop point;
i. using the self-ownership of each loop point to calculate a real/loop adjusted indirect ownership for each unknown entity P;
j. using the results from the de-looping to determine the self-ownership of a next furthest loop point from the target business;
k. repeating step j until self-ownership of all loop points is calculated;

l. aggregating direct and real/loop adjusted indirect ownership of each Pi to determine total ownership of the target business by each Pi as an ultimate beneficial owner; and m. aggregating the direct and real/loop adjusted indirect ownership of the unknown entity P to determine unknown total ownership of the target business by the unknown entity P, as an unallocated ownership of the target business for which there is not enough data to determine one hundred percent ownership.

14. The apparatus of claim 13, wherein the memory further comprises of computer readable instructions for causing the processor to analyze any linear ownership relations in the database, to calculate the percentage ownership of each of the beneficial owners of the target business.

15. The apparatus of claim 13, wherein the database is a graph database.

16. The apparatus of claim 13, wherein the computer readable instructions further comprise instructions for constructing a diagram of all owners of a target business, wherein the owners are nodes, and ownership relationships are links between the nodes.

17. The apparatus of claim 16, wherein the computer readable instructions further comprise instructions for determining the maximum number of steps in the diagram to be traversed from the target business to the furthest owner.

18. The apparatus of claim 13, wherein the computer readable instructions further comprise instructions for:
searching the diagram of all owners of a target business to identify at least one of a plurality of predetermined patterns of ownership; and
using predetermined calculations corresponding to each predetermined patterns of ownership found to perform a portion of the calculating of the beneficial ownership of the target business.

19. The apparatus of claim 13, wherein the computer readable instructions further comprise instructions for, when ownership relationships are de-looped, and the loops are simple loops or contain hidden relationships, allocating the percentage of ownership de-looped equally between entities having some percentage of ownership in an entity at an end of the loop.

20. The apparatus of claim 14, wherein the computer readable instructions further comprise instructions for, when ownership relationships are de-looped, and the loops are more complex than a simple loop, or where owners are undisclosed, assigning a constant value for undisclosed entities, and using successive multiplications by the constant value to determine proceeding ownership values in the calculating.

21. The apparatus of claim 20, wherein the constant value is used when an exact percentage of ownership of an entity is not known.

22. The apparatus of claim 13, further wherein the computer readable instructions further comprise instructions for:
determining an entire ownership structure of the target business;
determining types of ownership relationships within the structure;
using calculations appropriate for each ownership relationship within the structure to determine an extent of beneficial ownership for that relationship; and
generating beneficial ownership data responsive to the query.

23. The apparatus of claim 22, wherein the ownership relationships include at least one of linear, loops, self-links and hidden.

24. The apparatus of claim 23, wherein beneficial ownership data includes at least one of firmographic data on the entities, a list of direct, indirect, controlling and beneficial owners, a full ownership structure, and ultimate beneficial owner paths.

25. A computer readable non-transitory storage medium having non-transitory instructions thereon for causing a processor of a computer to perform the steps of:
populating a database wherein businesses and ownership relationships between the businesses are represented by nodes and links;
querying the database to establish the related ownership links;
analyzing the query used to determine ownership loops;
de-looping the ownership relationships; and
calculating the percentage ownership of each of the beneficial owners of the target business based on de-looped ownership relationships;
wherein determining the extent of beneficial ownership of the target business further comprises:
a. calculating direct ownerships for the target business;
b. assigning any missing ownership percentage to an unknown entity P so that the total direct ownership is one hundred percent;
c. for any entity that has direct ownership, calculating upper level indirect ownership and assigning any missing ownership to unknown entity P;
d. for any remaining entity that is still an indirect owner at an upper level, repeating step c until all ownerships are directed to at least one other entity Pi or unknown entity P;
e. identifying all loop points and looping structures;
f. continuing to calculate the indirect ownership as in step c;
g. determining the furthest loop and loop point from the target business;
h. performing a self-ownership calculation by de-looping the furthest loop to calculate self-ownership of the furthest loop point;
i. using the self-ownership of each loop point to calculate a real/loop adjusted indirect ownership for each unknown entity P;
j. using the result from the de-looping to determine the self-ownership of a next furthest loop point from the target business;
k. repeating step j until self-ownership of all loop points is calculated;
l. aggregating direct and real/loop adjusted indirect ownership of each Pi to determine total ownership of the target business by each Pi as an ultimate beneficial owner; and
m. aggregating the direct and real/loop adjusted indirect ownership of the unknown entity P to determine unknown total ownership of the target business by the unknown entity P, as an unallocated ownership of the target business for which there is not enough data to determine one hundred percent ownership.

26. A system for determining the extent of beneficial ownership of a target business, comprising:
a plurality of databases on at least one server;
a communications network for exchanging data between the databases and data calculation components, including:
a processor;
a memory containing a series of computer readable instructions for causing the processor to execute the steps of:

populating an additional database wherein businesses ownership relationships between the businesses are represented by nodes and links;

querying the database to establish the related ownership links;

analyzing the query to determine ownership loops;

de-looping the ownership relationships; and calculating the percentage ownership of each of the beneficial owners of the target business based on de-looped ownership relationships;

wherein determining the extent of beneficial ownership of the target business further comprises:

a. calculating direct ownerships for the target business;

b. assigning any missing ownership percentage to an unknown entity P so that the total direct ownership is one hundred percent;

c. for any entity that has direct ownership calculating upper level indirect ownerships and assigning any missing ownership to unknown entity P;

d. for any remaining entity that is still an indirect owner at an upper level, repeating step c until all ownerships are directed to at least one other entity Pi or unknown entity P;

e. identifying all loop points and looping structures;

f. continuing to calculate the indirect ownership as in step c;

g. determining the furthest loop and loop point from the target business;

h. performing a self-ownership calculation by de-looping the furthest loop to calculate self-ownership of the furthest loop point;

i. using the self-ownership of each loop point to calculate a real/loop adjusted indirect ownership for each unknown entity P;

j. using the results from the de-looping to determine the self-ownership of a next furthest loop point from the target business;

k. repeating step j until self-ownership of all loop points is calculated;

l. aggregating direct and real/loop adjusted indirect ownership of each Pi to determine total ownership of the target business by each Pi as an ultimate beneficial owner; and m. aggregating the direct and real/loop adjusted indirect ownership of the unknown entity P to determine unknown total ownership of the target business by the unknown entity P, as an unallocated ownership of the target business for which there is not enough data to determine one hundred percent ownership.

27. The system of claim 26, further comprising apparatus for providing at least one of a query concerning beneficial ownership of a single target business or a batch of target businesses to cause the system to provide beneficial ownership data.

28. The system of claim 26, wherein the additional database is cloud based, and comprises:

a master database; and a series of slave databases and load balancers that are created in the cloud when needed to perform the calculating in a given period of time, when queries concerning a batch of target businesses are provided to the system.

* * * * *